United States Patent
Yamaguchi et al.

(10) Patent No.: US 6,977,111 B2
(45) Date of Patent: Dec. 20, 2005

(54) MULTI-LAYER PAPER PEELABLE INTO AT LEAST TWO THIN SHEETS

(75) Inventors: Hideyuki Yamaguchi, Numazu (JP); Hiroshi Tateishi, Fujinomiya (JP); Ippei Kato, Shizuoka-ken (JP); Munenaka Koyama, Fuji (JP); Yoshihiro Mimura, Numazu (JP)

(73) Assignees: Ricoh Company, Ltd., Tokyo (JP); Tohoku Ricoh Co., Ltd., Miyagi-ken (JP); Mishima Paper Co., Ltd., Shizuoka-ken (JP)

( * ) Notice: Subject to any disclaimer, the term of this patent is extended or adjusted under 35 U.S.C. 154(b) by 396 days.

(21) Appl. No.: 10/031,738

(22) PCT Filed: May 22, 2001

(86) PCT No.: PCT/JP01/04290

§ 371 (c)(1),
(2), (4) Date: Jan. 22, 2002

(87) PCT Pub. No.: WO01/90481

PCT Pub. Date: Nov. 29, 2001

(65) Prior Publication Data

US 2002/0153110 A1  Oct. 24, 2002

(30) Foreign Application Priority Data

May 22, 2000 (JP) ......................... 2000-150559
Dec. 26, 2000 (JP) ......................... 2000-395870

(51) Int. Cl.⁷ ............................................. B32B 3/00

(52) U.S. Cl. ................. 428/195; 428/207; 428/323; 428/411.1; 428/532; 428/534; 428/536; 428/537.5; 427/256; 427/272; 427/282; 556/400; 556/465

(58) Field of Search .............................. 428/195, 207, 428/411.1, 323, 536.1, 537.5, 532, 534; 556/400, 465; 427/256, 272, 282

(56) References Cited

U.S. PATENT DOCUMENTS

| | | | | |
|---|---|---|---|---|
| 4,670,012 A | * | 6/1987 | Johnson | 604/390 |
| 5,707,712 A | * | 1/1998 | Fujimura et al. | 428/195.1 |
| 5,874,157 A | * | 2/1999 | Robinson et al. | 428/194 |
| 6,034,168 A | * | 3/2000 | Wang | 524/505 |
| 6,610,762 B1 | * | 8/2003 | Webster | 522/120 |

FOREIGN PATENT DOCUMENTS

| | | |
|---|---|---|
| GB | 1522948 | 8/1978 |
| JP | 52-42908 | 4/1977 |
| JP | 63-296938 | 12/1988 |
| JP | 3-167385 | 7/1991 |
| JP | 5-246170 | 9/1993 |

* cited by examiner

Primary Examiner—Leszek Kiliman
(74) Attorney, Agent, or Firm—Cooper & Dunham LLP

(57) ABSTRACT

Disclosed is a multi-layer paper suitable as a material for preparing heat-sensitive stencil printing masters. The multi-layer paper is produced by combining a plurality of thin paper layers by paper making. The multi-layer paper has a peel strength of 10 N/m or less and may be delaminated into at least two tissue sheets.

226 Claims, 3 Drawing Sheets (a)

(b)

//MULTI-LAYER PAPER PEELABLE INTO AT LEAST TWO THIN SHEETS

TECHNICAL FIELD

This invention relates to a multi-layer paper peelable into at least two tissue sheets, to a method of producing a tissue sheet using the multi-layer paper, to a tissue sheet obtained from the multi-layer paper, to a reinforced tissue sheet material having a tissue sheet to which a reinforcing member is bonded, to a reinforced multi-layer paper material having a reinforcing sheet bonded to a multi-layer paper, to a method of producing such a reinforced tissue sheet material using the reinforced multi-layer paper material, to a material for producing a heat-sensitive stencil printing master, to a heat-sensitive stencil printing master, to a heat-sensitive stencil paper and to a method of producing a heat-sensitive stencil printing master.

As a method of preparing a tissue paper for use as a porous substrate for a heat-sensitive stencil printing master, there is known a method in which fibers having a small diameter are subjected to wet paper making. In such a tissue paper preparing method, there is a limitation in thickness of the producible tissue paper. Thus, it is difficult to prepare tissue paper having a small basis weight. Additionally, there is a problem because production costs are high.

JP-B-H06-57920 discloses a method of preparing a thin paper formed of a synthetic fiber. According to the disclosed method, a wet paper (A) of cellulose fibers is combined with a wet paper (B) polyester fibers by paper making and the combined paper is dried to obtain a 2-layer paper. The 2-layer paper is heat-bonded under pressure at a temperature higher than the softening point of the polyester fibers. The cellulose fiber layer is then peeled off to leave a thin paper of the polyester fibers.

The known method is, however, not satisfactory from the standpoint of production apparatus, thermal energy and production costs, because of the necessity of a specific heat press bonding device for a step performed at a temperature higher than the softening point of the synthetic fiber for heat-bonding the synthetic fiber layer of a multi-layer paper obtained after a drying step. Further, the multi-layer paper obtained after the heat press bonding step of the conventional method has a problem because it is difficult to harmonize both the interlayer peelability and the strengths of tissue paper obtained therefrom. When a tissue sheet having high strengths is produced, it is necessary to increase the temperature at which the heat-bonding is performed. This results in very poor interlayer peelability. On the other hand, when a multi-layer paper having good interlayer peelability is desired, it is necessary to use a low heat-bonding temperature. In this case, the strengths of the tissue paper obtained from the multi-layer paper are very low. Additionally, since the thin paper of the synthetic fibers prepared by delamination of the multi-layer paper has been subjected to a press bonding treatment at a high temperature, the density thereof is high. With the known method, it is very difficult to produce a thin paper having a density of 0.4 $g/cm^3$ or less.

DISCLOSURE OF THE INVENTION

The objective problems of the present invention are as follows.

(1) To provide a multi-layer paper having small peel strength and excellent peelability in a multi-layer paper peelable into two or more tissue sheets.

(2) To provide a method which can produce a multi-layer paper having excellent peelability at an economically advantageous manner without using a specific heat press-bonding step.

(3) To provide a high grade tissue sheet having a low basis weight and a low density using the multi-layer paper having excellent peelability and a method of producing same.

(4) To provide a reinforced tissue sheet material having a tissue sheet to which a reinforcing member is bonded.

(5) To provide a reinforced multi-layer paper material having a reinforcing member bonded to the multi-layer paper.

(6) To provide a method of producing a reinforced tissue sheet material using the above reinforced multi-layer paper material.

(7) To provide a material for preparing a heat-sensitive stencil printing master, which has can give a high grade material having a low basis weight and a low density.

(8) To provide a high grade heat-sensitive stencil printing master having a low density and a low basis weight and a method of preparing such a stencil printing master.

The present inventors have made intensive studies with a view to solving the above objective problems and have completed the present invention.

Thus, in accordance with the present invention, there are provided the following inventions:

(1) A multi-layer paper comprising at least two paper layers combined by a paper making method, characterized in that said multi-layer paper has at least one peelable paper layer interface having a peel strength of 10 N/m or less, and in that said multi-layer paper is peelable into at least two tissue sheets at said peelable paper layer interface.

(2) A multi-layer paper as recited in (1) above, wherein one of the two adjacent paper layers between which said peelable paper layer interface is defined is mainly made of cellulose fibers, while the other paper layer is mainly made of synthetic fibers including binder fibers, said binder fibers exhibiting binder effect at a temperature of 90–120° C.

(3) A multi-layer paper as recited in (2) above, wherein said synthetic fibers are heteroatom-containing synthetic fibers.

(4) A multi-layer paper as recited in (2) above, wherein said synthetic fibers are polyolefin fibers.

(5) A multi-layer paper as recited in any one of (2)–(4) above, wherein said binder fibers are composite fibers and are contained in an amount of 20–100 mass %.

(6) A multi-layer paper as recited in any one of (2)–(4) above, wherein said binder fibers are single-component fibers and are contained in an amount of 20–70 mass %.

(7) A multi-layer paper as recited in (5) above, wherein said binder fibers are composite fibers having a core-sheath structure, said sheath being comprised of a resin exhibiting a binder effect at a temperature of 90–120° C.

(8) A multi-layer paper as recited in (7) above, wherein the resin constituting said sheath is a polyester resin.

(9) A multi-layer paper as recited in (7) above, wherein the resin constituting said sheath is a polyolefin resin or an ethylene-vinyl acetate copolymer resin.

(10) A multi-layer paper as recited in (1) above, wherein one of the two adjacent paper layers between which said peelable paper layer interface is defined is made of synthetic fibers including composite binder fibers having a low melting point component made of a polyolefin resin or an ethylene-vinyl acetate copolymer resin, while the other paper layer is made of synthetic fibers including composite binder fibers having a low melting point com-

(11) A multi-layer paper as recited in (10) above, wherein said one paper layer made of synthetic fibers including composite binder fibers having a low melting point component made of a polyolefin resin or an ethylene-vinyl acetate copolymer resin is mainly made of polyolefin fibers, and wherein said binder fibers of said one paper layer exhibits binder effect at a temperature of 90–120° C. and is contained in an amount of 20–100 mass %.

(12) A multi-layer paper as recited in (10) above, wherein said the other paper layer made of synthetic fibers including composite binder fibers having a low melting point component made of a polyester resin is mainly made of heteroatom-containing synthetic fibers, and wherein said binder fibers exhibit binder effect at a temperature of 90–120° C. and is contained in an amount of 20–100 mass %.

(13) A multi-layer paper as recited in any one of (2)–(8) above, wherein said one layer mainly made of cellulose fibers contains a release agent.

(14) A multi-layer paper as recited in any one of (2)–(8) above, wherein said the other layer mainly made of synthetic fibers are made of polyester fibers.

(15) A multi-layer paper as recited in any one of (1)–(14) above, wherein one of the two adjacent paper layers between which said peelable interface is defined is made of relatively more highly oriented fibers as compared with that of the other paper layer.

(16) A multi-layer paper as recited in any one of (1)–(15) above, wherein at least one of the two surfaces of two adjacent paper layers which surfaces define said peelable interface has been subjected to a smoothing treatment.

(17) A multi-layer paper as recited in any one of (1)–(16) above, wherein at least one of said tissue sheet peeled from said multi-layer paper has a basis weight of 1–20 g/m².

(18) A multi-layer paper as recited in any one of (2)–(8) above, wherein the tissue sheet peeled from said multi-layer paper and made of the synthetic fibers has a density of not greater than 0.35 g/cm³.

(19) A multi-layer paper as recited in (3) above, wherein the tissue sheet peeled from said multi-layer paper and made of the heteroatom-containing synthetic fibers has a density of not greater than 0.35 g/cm³.

(20) A multi-layer paper comprising at least three paper layers unified by a paper making method, characterized in that said multi-layer paper has, as an intermediate layer, at least one paper layer which can cause intralayer delamination and which has a peel strength of 10 N/m or less, and in that said multi-layer paper is peelable into at least two tissue sheets at said intermediate paper layer.

(21) A multi-layer paper as recited in (20) above, wherein each of the paper layers adjacent to said intermediate layer is mainly made of synthetic fibers including at least binder fibers, said binder fibers exhibiting binder effect at a temperature of 90–120° C.

(22) A multi-layer paper as recited in (21) above, wherein said binder fibers are composite fibers and are contained in an amount of 20–100 mass %.

(23) A multi-layer paper as recited in (21) above, wherein said binder fibers are single-component fibers and are contained in an amount of 20–70 mass %.

(24) A multi-layer paper as recited in (22) above, wherein said binder fibers are composite fibers having a core-sheath structure, said sheath being comprised of a resin exhibiting a binder effect at a temperature of 90–120° C.

(25) A multi-layer paper as recited in any one of (20)–(24) above, wherein said paper layer which can cause intralayer delamination is mainly made of polyester fibers.

(26) A multi-layer paper as recited in (25) above, wherein said paper layer made of said polyester fibers has a basis weight of 2–8 g/m².

(27) A multi-layer paper as recited in any one of (20)–(24) above, wherein said paper layer which can cause intralayer delamination is mainly made of cellulose fibers.

(28) A multi-layer paper as recited in (25) above, wherein said paper layer made of said cellulose fibers has a basis weight of 5–10 g/m².

(29) A method of forming tissue sheets, comprising providing a multi-layer paper as recited in any one of (1)–(19) above, and delaminating said multi-layer paper at said peelable paper layer interface to obtain at least two tissue sheets.

(30) A method as recited in (29) above, wherein at least one of said tissue sheets has a basis weight of 2–20 g/m².

(31) A method of forming tissue sheets, comprising providing a multi-layer paper as recited in any one of (20)–(28) above, and delaminating said multi-layer paper at said paper layer which can cause intralayer delamination to obtain at least two tissue sheets.

(32) A method as recited in (31) above, wherein at least one of said tissue sheets has a basis weight of 2–20 g/m².

(33) A tissue sheet obtained by a method as recited in any one of (29)–(32) above and having a basis weight of 2–20 g/m².

(34) A reinforced tissue sheet material, comprising a tissue sheet as recited in (33) above and a reinforcing member bonded thereto.

(35) A reinforced tissue sheet material as recited in (34) above, wherein said reinforcing member is a polymer film or a metal foil.

(36) A reinforced multi-layer paper material, comprising a multi-layer paper as recited in any one of (1)–(28) above and a reinforcing member bonded to at least one of the both sides of said multi-layer paper.

(37) A reinforced multi-layer paper material as recited in (36) above, wherein said reinforcing member is a polymer film or a metal foil.

(38) A method of preparing a reinforced tissue sheet material, comprising providing a reinforced multi-layer paper material as recited in (36) or (37) above, and delaminating said multi-layer paper to obtain a reinforced tissue sheet material having said reinforcing member bonded thereto.

(39) A porous support material for producing a heat-sensitive stencil printing master, comprising a multi-layer paper as recited in any one of (1)–(28) above.

(40) A material for producing a heat-sensitive stencil printing master, comprising a laminate obtained by bonding a thermoplastic polymer film to at least one side of a multi-layer paper as recited in any one of (1)–(28) above.

(41) A heat-sensitive stencil printing master comprising a porous support, and a thermoplastic polymer film bonded to said porous support, wherein said porous support is a tissue paper as recited in (33) above.

(42) A method of preparing a heat-sensitive stencil printing master, comprising a step of separating a tissue sheet from a material as recited in (39) above, and a step of bonding a thermoplastic polymer film to the peeled surface of said separated thin sheet.

(43) A method of preparing a heat-sensitive stencil printing master, comprising separating, from said material as recited in (40) above, a laminate having the thin, sheet to which said thermoplastic polymer film has been bonded.

BEST MODE FOR CARRYING OUT THE INVENTION

One embodiment of the multi-layer paper according to the present invention is a paper including at least two paper layers prepared and unified by a paper making method, wherein the multi-layer paper has at least one peelable paper layer interface and is peelable into at least two tissue sheets at the interface. Such a multi-layer paper will be hereinafter referred to as Multi-layer Paper A.

The number of the paper layer of Multi-layer Paper A is not specifically limited as long as it is at least two. The number is generally 2–5. The number of the peelable interface is at least one, generally 1–4, preferably 1–2. Each of the paper layers of Multi-layer Paper A has a basis weight of 1–20 g/m$^2$, preferably 2–20 g/m$^2$. The basis weight of respective paper layers may be the same or may be different.

Multi-layer Paper A is delaminated at the peelable paper layer interface (hereinafter also referred to simply as peelable interface) to give tissue sheets corresponding in number to the number of the peelable interface. When the number of the peelable interface is n, the number N of the tissue sheets delaminated from one multi-layer paper is n+1, namely N=+1.

The tissue sheets obtained by delamination of Multi-layer Paper A may be composed of one layer or a plural layers, generally 2–4 layers. When Multi-layer Paper A having n-number peelable interface is delaminated, (n+1)-number of tissue sheets can be obtained simultaneously. Alternatively, one delamination procedure can give two tissue sheets and each tissue may be successively delaminated finally into (n+1)-number of tissue sheets.

In one preferred embodiment, Multi-layer Paper A is a 2-layer paper peelable at the paper layer interface. The multi-layer paper (2-layer paper) has a basis weight of 3–40 g/m$^2$, preferably 5–20 g/m$^2$. The 2-layer paper gives two tissue sheets (hereinafter also referred to as tissue papers) each of which is a single-layer sheet and at least one of which has a basis weight of 1–20 g/m$^2$, preferably 2–10 g/m$^2$. Such a low basis weight tissue sheet may be suitably used as a porous support for a polymer film of a heat-sensitive stencil printing master.

In another preferred embodiment, Multi-layer Paper A is a 3-layer paper having two peelable interfaces. The multi-layer paper (3-layer paper) has a basis weight of 4–60 g/m$^2$, preferably 8–30 g/m$^2$. Each of the three tissue sheets is a single-layer sheet and at least one of them has a basis weight of 1–20 g/m$^2$, preferably 2–10 g/m$^2$.

In a further preferred embodiment, Multi-layer Paper A is a 3-layer paper having one peelable interface at which delamination occurs. One of the two tissue sheets is a single-layer sheet, while the other tissue sheet is a two-layer sheet having a basis weight of 3–40 g/m$^2$, preferably 5–20 g/m$^2$.

Each of the paper layers constituting Multi-layer Paper A may be formed of organic fibers or inorganic fibers. Examples of the organic fibers include natural fibers such as cellulose fibers and protein fibers, semisynthetic or reclaimed fibers such as rayon fibers and Lyocell fibers, and synthetic fibers such as polyolefin fibers, polyester fibers, nylon fibers and acrylonitrile fibers. Examples of the inorganic fibers include carbon fibers, glass fibers and alumina fibers. The organic and inorganic fibers have a diameter of 1–40 μm, preferably 3–20 μm, and a length of 1–15 mm, preferably 2–10 mm.

The above-described fibers constituting each paper layer may be a mixture of various kinds of the above fibers. When two or more kinds of fibers are used as a mixture, the kinds of the fibers and the mixing ratio thereof may be suitably determined according to the intended use of the tissue sheets delaminated from the multi-layer paper.

Each of the paper layers constituting Multi-layer Paper A generally has an intralayer peel strength of greater than 10 N/m, preferably at least 20 N/m.

The peelable interface of Multi-layer Paper A generally has a peel strength of 10 N/m or less, preferably 6 N/m or less. The lower limit of the peel strength is not specifically limited. A peel strength of the peelable interface more than 10 N/m but no more than 20 N/m is likely to cause partial intralayer destruction upon delamination. Delamination is impossible when the peel strength is more than 20 N/m. When the peel strength is at least 0.5 N/m, the multi-layer paper can be handled as an integrated state without being peeled in the interface up to until the delamination has been conducted.

Because of its very low peel strength of 10 N/m or less and excellent peelability, Multi-layer Paper A can give high grade, delaminated tissue sheets free of partial destruction even though the low basis weight and the density are low.

It is preferred that the two adjacent paper layers between the peelable interface of Multi-layer Paper A be such a combination in which affinity therebetween is low for reasons of high peelability. Examples of combinations include a combination of a layer of cellulose fibers with a layer of synthetic fibers, such as polyester fibers, vinylon fibers, nylon fibers, acrylonitrile fibers or polyolefin fibers; a combination of a layer of polyolefin fibers with a layer of heteroatom (e.g. oxygen or nitrogen)-containing synthetic fibers such as polyester fibers, vinylon fibers, nylon fibers or acrylonitrile fibers. For the purpose of the present invention, a combination of a cellulose fiber-based layer with a synthetic fiber-based layer or a combination of a polyolefin-based layer with a polyester fiber-based layer is preferred. Especially preferred combination is a combination of a cellulose fiber-based layer with a polyester fiber-based layer. The cohesive force of a cellulose fiber layer is mainly attributed to hydrogen bonding between fibers, whereas that of a synthetic fiber layer is mainly attributed to adhesion between fibers through binder fibers. These paper layers have sufficient strengths. Because of poor affinity between the fibers constituting the layers, the peel strength is low so that they are easy to separate.

As the fibers constituting the cellulose fiber paper layer, any conventionally employed pulp fibers, such as wood pulp fibers or paper making pulp fibers, may be used. For reasons of low peel resistance and suitable functions for tissue paper, the use of fibers conventionally used for low density tissue paper is preferred. The use of natural fibers of, for example, kozo, mitsumata, flax, Manila hemp or sisal, is preferred. Manila hemp and sisal are easily feasible and suitably used. The natural fibers are desirably not heavily beaten.

The cellulose fibers may be cellulose fiber-based fibers and may be added with other fibers such as semi-synthetic fibers e.g. rayon fibers or Lyocell fibers. Further, the cellulose fibers may be blended with synthetic fibers, such as vinylon fibers, polyacrylonitrile fibers or polyester fibers, in an amount of not greater than 10 mass %, as long as the blend does not adversely affect the objects of the present invention. Further, the cellulose fibers may be blended with binder fibers, such as composite fibers having a core-sheath structure whose surfaces are softened at the time of drying their wet paper or polyvinyl alcohol fibers whose surfaces are fusible with hot water, in an amount of not greater than 10 mass %. Additionally, the cellulose fiber-based layer may contain a sizing agent, a dry or wet paper strength additive, a dispersing agent, an anti-foaming agent, an antistatic agent and other chemicals for use in paper making.

It is preferred that the cellulose fiber-based layer contain a releasing agent for reasons of reduction of peel resistance in the interface. The releasing agent may be a conventionally employed wax such as polyethylene wax or a higher fatty acid ester. The amount of the releasing agent is such as not to adversely affect the usage of tissue papers. For example, in the case of a heat-sensitive stencil printing master, the amount of the releasing agent is such as not to adversely affect the lamination with a thermoplastic resin film. Other chemicals having an effect as a releasing agent, such as an alkyl ketene dimer sizing agent, may be suitably used as the releasing agent.

The synthetic fiber-based layer may be a layer containing synthetic fibers as major component. Various synthetic fibers may be suitably selected according to the functions required for tissue papers obtained by delamination. Various kinds of synthetic fibers conventionally employed for the formation of paper may be used. The synthetic fibers may be, for example, heteroatom-containing synthetic fibers such as vinylon fibers, polyacrylonitrile fibers, polyamide fibers or polyester fibers; or polyolefin fibers. Composite binder fibers are composed of a high melting point component and a low melting point component and are generally named using the resin of the high melting point component. Thus, composite binder fibers containing heteroatom-containing synthetic fibers or polyolefin fibers as the high melting point component thereof may be termed as heteroatom-containing resin composite binder fibers and polyolefin composite binder fibers, respectively. Also, paper layers in the present invention are referred to herein in terms of the major fibers constituting the paper layer and in terms of the resin of the high melting point component of the binder fibers constituting the paper layer. For example, there is herein called a polyolefin-based layer or paper layer.

As the synthetic fibers, heteroatom-containing synthetic fibers such as polyester fibers are suitably used. When a tissue sheet of synthetic fibers obtained by delamination is intended to be used as a material for preparing a heat-sensitive stencil printing master, it is preferred that the synthetic fibers have a fineness of. 0.1–2.2 dtex and a length of 15 mm or less, more preferably 10 mm or less, most preferably 5 mm or less. The lower limit of the fiber length is generally about 1 mm. The synthetic fiber-based layer may contain semi-synthetic fibers, such as rayon or Lyocell, or cellulose fibers, such as Manila hemp or sisal, in an amount of 10% by weight or less. Additionally, the synthetic fiber-based layer may contain a paper strength additive, a dispersing agent, an anti-foaming agent, an antistatic agent and other chemicals for use in paper making.

The synthetic fiber-based layer used in the present invention has a basis weight of 1–20 g/m$^2$, preferably 2–10 g/m$^2$, and a density of 0.40 g/cm$^3$ or less, preferably 0.35 g/cm$^3$ or less, more preferably 0.25 g/cm$^3$ or less. The lower limit of the density is generally 0.10 g/cm$^3$.

The peelability of the interface also depends upon the sectional shape of the fibers of the each paper layer. In the case of any of the cellulose fibers, synthetic fibers and semisynthetic fibers, the peel strength of the interface decreases as the sectional shape of the fiber becomes rounder, because the number of contact points and the area of contact between the fibers decrease. For example, the peel strength of the interface between a Manila hemp fiber layer and a polyester fiber layer of a multi-layer paper obtained by unifying them by a paper making method using a TAPPI standard sheet machine, was 2.1 N/m. When flat, softwood kraft pulp (NBKP) fibers were substituted for the Manila hemp fibers, the peel strength was 3.6 N/m and greater than that of the Manila hemp fibers. Since a mercerization treatment can round the sectional shape of cellulose fibers in a small degree, the use of mercerized cellulose fibers can decrease the peel resistance of the interface.

A peel strength of 10 N/m or less may be obtained even in the case of a multi-layer paper comprised of non-oriented fiber layers made by unification by paper making using a TAPPI standard sheet machine. However, it is preferred that the adjacent two paper layers defining the interface be a combination of a high oriented fiber layer and a low oriented fiber layer, because the contact points and contact area between fibers in the paper layer interface decrease and because the peel resistance in the paper layer interface decreases. In terms of "degree of fiber orientation" which is defined as a ratio of the tensile strength in the machine direction to the tensile strength in the cross direction, it is preferred that a difference in degree of fiber orientation between the adjacent two layers be at least 3, more preferably at least 5. The upper limit of the difference is generally 8. In the case of unification by paper making of a combination of paper layers both of which have a high degree of fiber orientation, it is difficult to obtain a peel strength of 10 N/m or less. It is also difficult to uniformly delaminate them in the cross direction. Except a roll former (rote former) which can provide a very low degree of fiber orientation, a cylinder machine provides a paper making method producing a high degree of fiber orientation of 6 or more. A Fourdrinier machine or a short wire machine can generally provide a slightly less degree of orientation of 3–5. An inclined-wire machine can produce a paper having a wide degree of orientation of from less than 1 up to a comparable degree to the cylinder machine but is characterized in that it can provide a degree of fiber orientation of 2 or less.

Multi-layer Paper A of the present invention may be obtained by a conventional paper making method in which at least two wet embryonic layers are combined together and thereafter dried. Each of the wet layers corresponds to each of the paper layers constituting Multi-layer Paper A. A wet paper layer may be formed from a fiber-containing material. The fibers contained in the material may be suitably selected according to the desired constitution of the multi-layer paper. In addition to fibers, the stock may contain a sizing agent, a paper strength additive, a dispersing agent, an anti-foaming agent, an antistatic agent and other paper making chemicals, as necessary. As a paper machine, there may be used any suitable known paper machine such as a cylinder machine, an inclined-wire machine, a Fourdrinier machine or a short wire machine.

In the paper making method employed for the purpose of the present invention, two or more wet layers providing peelable interface or interfaces are combined and unified together. Suitable examples of the process for the unification include (i) combining a wet synthetic fiber layer formed using a cylinder machine with a wet cellulose fiber layer formed using an inclined-wire machine, (ii) combining a wet synthetic fiber layer formed using a cylinder machine with a wet cellulose fiber layer formed using an inclined-wire machine and with a wet synthetic fiber layer formed using a cylinder machine, and (iii) combining a wet synthetic fiber layer formed using an inclined-wire machine with a wet cellulose fiber layer formed using a cylinder machine and with a wet synthetic fiber layer formed using an inclined-wire machine.

To reduce the peel resistance in the interface at which two layers are combined, it is important to reduce entanglement of fibers between the two layers. Thus, it is preferred that at least one of the two surfaces of the two layers, which surfaces are to form the interface therebetween be subjected to a smoothing treatment for reasons of reducing the peel resistance. The smoothing treatment may include pressing a surface of a running wet layer supported on a felt with, for example, a wire roll so that those parts of fibers protruding from the surface are pressed down or the surface is smoothed. A multi-layer paper obtained using such a surface-smoothed layer contains a paper layer which corresponds to the wet layer and whose surface is smoothed. Namely, in the interface between the surface-smoothed paper layer and another layer, the contact points and contact area between the fibers of respective layers are reduced. Therefore, the peel resistance in the interface can be reduced. As a result, it is possible to obtain an interface whose peel strength is reduced to 10 N/m or less.

A further effective method to obtain a peelable interface is a method in which a releasing agent is incorporated into at least one of two adjacent layers to be combined. By adding the releasing agent to a stock, the releasing agent can be incorporated into the wet paper layer. The amount of the releasing agent may vary according to the intended use of the multi-layer paper produced. Generally, the releasing agent is used in an amount of 0.01–1.5 parts by mass (solid matter), preferably 0.1–1.0 part by mass, per 100 parts by weight of the fibers.

A further effective method of obtaining a peelable interface is a method in which one of the adjacent two layers is imparted with a higher degree of fiber orientation than the other is. In terms of "degree of fiber orientation" which is defined as a ratio of the tensile strength in the machine direction to the tensile strength in the cross direction, it is preferred that a difference in degree of fiber orientation between the high oriented fiber layer and the low oriented fiber layer be at least 3, more preferably at least 5. A high orientation can be obtained by using a cylinder machine which can provide a high degree of fiber orientation of 6 or more. A Fourdrinier machine or a short wire machine can produce a paper layer having a degree of orientation of 3–5. With an inclined-wire machine, a paper layer having a degree of fiber orientation of 2 or less may be prepared.

As will be understood from the above description, it is preferred that a method be adopted in which a wet web formed by a cylinder machine is combined with a wet web formed by an inclined-wire machine for the purpose of obtaining a multi-layer paper having highly peelable interface.

A further effective method of improving the peelability of the interface at which two layers are combined is to decrease the density of a multi-layer paper by reducing a pressure at which the two wet layers are combined or at which the combined wet layers is pressed for dewartering, or by reducing a touch pressure at which the combined layers are contacted with a dryer.

In Multi-layer Paper A according to the present invention, the paper layer composed mainly of synthetic fibers (synthetic fiber paper layer) contain binder fibers. When the synthetic fiber layer is combined with another paper layer, for example a paper layer composed mainly of cellulose fibers (cellulose fiber paper layer), and when the combined layers are heated with a drier for drying, the surfaces of the binder fiber are fused so that the fibers are bonded together to give a paper layer having an increased strength. In the case of drying combined paper layers, when the drying temperature is high, the peel strength of the interface increases so that the peelability tends to be poor. Thus, it is important that the drying temperature be suitably controlled from the standpoint of both destruction strength of the paper layer and the peel strength of the interface. Such a temperature control is important when a Yankee drier which heats a multi-layer sheet from one side is used.

The binder fibers used in the present invention exhibit a binding effect at a drying temperature at which unified multi-layer wet web is dried. In this case, the drying temperature is a temperature to which the wet web is exposed during the drying step and is generally 90–120° C., preferably 90–110° C. Thus, any binder fibers may be used for the purpose of the present invention, as long as they can exhibit the binder effect at 90–120° C., preferably 90–110° C. The binder effect of the binder fibers is ascribed to adhesive softened components produced by softening part of the binder fibers when heated to the above temperature.

The resin component exhibiting its binder effect at the above temperature is a non-crystalline polymer or copolymer which is softened or melted at a temperature in the above range. Examples of such polymers or copolymers include polyester resins such as copolyesters (low melting point PET); polyolefin resins such as modified polyethylene (low melting point PE), polyethylene (PE) and modified polypropylene (low melting point PP); ethylene/vinyl acetate copolymers (EVA); copolymerized nylon; and polyvinyl alcohol (PVA) by hot water fusion.

The binder fibers include composite fibers and single-component fibers. Composite fibers are composed of a high melting point component and a low melting point component. The composite fibers may be of a side-by-side type or a core-sheath type. The side-by-side type fibers may be, for example, PET-low melting point PET fibers or PP-PE fibers. The core-sheath type fibers may be, for example, PET-low melting point PET fibers, PET-PE fibers, PET-low melting PP fibers, PP-low melting point PE fibers, PP-PE fibers, PET-low melting point PP fibers, nylon 66-nylon 6 fibers or PP-EVA fibers. The single-component fibers may be, for example, low melting point PET (copolyester) fibers, low melting point PP fibers, PE fibers or PVA fibers. In the present invention, any fibers may be used as the binder fibers as long as the fibers can exhibit the binding effect at the above temperature. Especially suitable binder fibers are PET-low melting point PET fibers which are polyester composite fibers having a so-called core-sheath structure. The proportion of the sheath component which is a low melting point component of the composite fibers of a core-sheath structure is generally 40–70 mass %. The copolyester of the sheath component of the composite fibers does not show a clear melting point but is softened or melted at the above-described drying temperature. Such a temperature can be measured by naked eyes through microscopic observation as a temperature at which surfaces of the fibers are melted at intersects and is referred to as fusion temperature or binding temperature.

The fineness of the binder fibers is preferably 0.1–2.2 dtex and the length thereof is 15 mm or less, preferably 10 mm or less, more preferably 5 mm or less.

Various kinds of binder fibers are commercially available and they can be used for the purpose of the present invention. Examples of core-sheath type composite fibers composed of a high melting point core component and a low melting point sheath component include PET-low melting point PET fibers such as SOFIT (R) N720, SOFIT (R)

N720H both manufactured by Kuraray Co., Ltd., MELTY 4080 manufactured by Unitika Ltd., TJ04CN manufactured by Teijin Ltd., NBF(SH) manufactured by Daiwabo Co., Ltd. and ETC manufactured by Chisso Corporation; PET-modified PP fibers such as NBF(SP) manufactured by Daiwabo Co., Ltd.; PP-low melting point PE fibers such as EAC manufactured by Chisso Corporation; PP-PE fibers such as NBF(H) manufactured by Daiwabo Co., Ltd. and ESC manufactured by Chisso Corporation; and PP-EVA fibers such as NBF(E) manufactured by Daiwabo Co., Ltd. Examples of side-by-side type composite fibers composed of a high melting point core component and a low melting point sheath component include PET-low melting point PET fibers such as SOFIT (R) N784 manufactured by Kuraray Co., Ltd.; PP-low melting point PE fibers such as EA manufactured by Chisso Corporation; and PP-PE fibers such as ES manufactured by Chisso Corporation. MELTY(R)4000 manufactured by Unitika Ltd. is an example of a single-component binder fibers composed only of a low melting point component. As PVA fibers, there may be mentioned VPB101, VPB105-1, VPB105-2 all manufactured by Kuraray Co., Ltd., and SMM, SML and SMS manufactured by Unitika Ltd.

In Multi-layer Paper A according to the present invention, at least a part of the synthetic fibers contained in the synthetic fiber paper layer are binder fibers. The amount of the binder fibers contained in the synthetic fibers is 20–100 mass %, preferably at least 30 mass %, more preferably at least 40 mass %, in the case of composite binder fibers. In the case of a single-component binder fibers, the amount is 20–70 mass %, preferably 60 mass % or less, more preferably 50 mass %.

In one preferred combination of adjacent two paper layers of Multi-layer Paper A, one paper layer contains heteroatom-containing synthetic resin fibers as a high melting point component that is not softened or melted at the drying temperature of 90–120° C., while the other paper layer contains polyolefin resin fibers as a high melting point component. In this case, as a resin component which exhibits the binder effect, namely as a low melting point sheath component of the composite binder fibers or as a resin component of the single-component binder resin, it is preferred that a low melting point polyester resin be used in the one layer containing the heteroatom-containing synthetic resin fibers and that a low melting point polyolefin resin or an ethylene/vinyl acetate copolymer be used in the other paper layer containing the polyolefin resin fibers.

The binder fibers used in a layer containing heteroatom-containing synthetic resin fibers may be composite fibers composed of a sheath component of a low melting point polyester resin and a core component of a heteroatom-containing synthetic resin or a high melting point polyolefin resin. As single-component binder fibers, there may be used low melting point polyester fibers. The use of the former composite binder fibers is preferable for reasons of good peelability when the adjacent paper layer is a cellulose fiber-based layer or a polyolefin fiber-based layer containing a low melting point polyolefin resin or an ethylene-vinyl acetate copolymer as a binder resin component.

The binder fibers used in a layer containing polyolefin fibers preferably contain a binder resin component of a low melting point polyolefin resin or an ethylene/vinyl acetate copolymer. In this case, good peelability may be obtained when the adjacent paper layer is a cellulose fiber-based layer or a layer containing a low melting point polyester resin as its binder resin component. As the binder fibers, it is preferable to use composite binder fibers composed of a low melting point polyolefin resin or an ethylene/vinyl acetate copolymer as a sheath component, and a high melting point polyolefin resin such as a polypropylene resin or a heteroatom-containing synthetic resin as a core component.

The heteroatom-containing synthetic fibers are those made of a synthetic resin containing a heteroatom (e.g. oxygen or nitrogen) such as polyester, polyamide, polyacrylate and polyacrylonitrile.

In Multi-layer Paper A according to the present invention in which each of the adjacent paper layers defining the peelable interface therebetween is made of synthetic resin fibers, it is possible to reduce the peel strength of the peelable interface by using resins having low affinity with each other for the sheath components of the binder fibers to be incorporated into respective paper layers. For example, when one of the two layers contains composite binder fibers containing a polyolefin resin or an ethylene/vinyl acetate copolymer as a resin constituting the sheath, the other layer may be suitably contains binder fibers containing a polyester resin as a resin constituting the sheath. As a consequence of the above combination, the peel strength of the interface can be reduced.

The production of Multi-layer Paper A will be described more concretely below.

(1) Preparation of Multi-layer Paper (I):

Using Manila hemp as cellulose fibers, two Manila hemp fiber layers were prepared and combined with a TAPPI standard sheet machine and then dried. The delamination in the interface at which two layers were combined caused partial breakage of the paper layers. The peel resistance was 14 N/m.

When the above procedures were repeated in the same manner as described except that one of the wet furnish layer was smoothed with a roller before combining with the other furnish layer, the peel strength of the two-layer paper was 9.8 N/m. The sheet was able to be uniformly separated at the interface therebetween.

The above paper layers were combined as follows. A layer of a furnish formed on a wire of the TAPPI standard sheet machine was contacted with a filter paper and picked up thereon. The wet furnish layer on the filter paper was overlaid with another furnish layer formed on the TAPPI standard sheet machine.

Separately, a wet furnish layer on a filter paper was dried in a hot air drier at 70° C. for 1.5 hours. The dried surface of the hemp fiber layer was fuzzy and had long 229 fuzzes per 100 cm². Another wet layer on a filter paper was subjected to a smoothing treatment and then dried. The fuzzes on the smoothed surface were shorter and the number thereof was 81 per 100 cm². The smoothing treatment was confirmed to be effective to press part of protruded fuzzes down into the wet layer.

(2) Preparation of Multi-layer Paper (II):

60 Mass % of non-stretched polyester fibers (TEPYRUS TKO8PN manufactured by Teijin Ltd.) having a fineness of 0.2 dtex and a length of 3 mm were mixed with 40 mass % of polyester binder fiber (sheath component: low melting point PET, fusion temperature: 110° C.; core component: PET; SOFIT N720 manufactured by Kuraray Co., Ltd.) having a fineness of 1.7 dtex and a length of 5 mm to obtain a stock. Using this stock, a polyester fiber layer was formed on a wire of a TAPPI standard sheet machine in an amount corresponding to a basis weight of 2 g/m² and was picked up on a filter paper. A Manila hemp pulp was beaten to Canadian Standard freeness (CSF) 550 to obtain a stock. Using this stock, a Manila hemp fiber layer was formed on a wire of a TAPPI standard sheet machine in an amount corresponding to a basis weight of 8 g/m². This was superimposed by picking up on the wet polyester fiber layer on the filter paper. The resulting combined sheet was pressed for dewatering and dried on a cylindrical drier at 105° C. for experimental use to obtain a 2-layer paper (II) having a polyester fiber layer and a Manila hemp fiber layer. The peel strength of the 2-layer paper was found to be 5.11 N/m in the combined interface. Delamination was uniformly occurred even though the basis weight of the polyester fiber layer is as small as 2 g/m². However, the polyester fiber tissue sheet thus obtained had a tensile strength of 0.030 kN/m which was near the lower limit enabling layer-layer separation.

(3) Preparation of Multi-layer Paper (III):

The procedures for the above multi-layer paper (II) were repeated in the same manner as described except that the basis weight of the polyester fiber layer was decreased to 1 g/m², thereby obtaining 2-layer paper (III). Due to internal destruction (breakage of the material) of the polyester fiber layer, the 2-layer paper (III) was not able to be delaminated at the interface.

(4) Preparation of Multi-layer Papers (IV) and (V):

The procedures for the above multi-layer paper (II) were repeated in the same manner as described except that the basis weight of the polyester fiber layer was increased to 5 g/m² and that the basis weight of the hemp fiber layer was decreased to 3 g/m² and 2 g/m², thereby obtaining 2-layer papers (IV) and (V), respectively. The peel strength of the 2-layer paper having the basis weight of the hemp fiber layer of 3 g/m² was found to be 2.92 N/m between the polyester fiber layer and the hemp fiber layer. The hemp fiber tissue sheet thus obtained had a tensile strength of 0.031 kN/m which was near the lower limit for providing a suitable basis weight of a tissue paper. In the case of the 2-layer paper having the basis weight of the hemp fiber layer of 2 g/m², it was difficult to delaminate at the interface, because of breakage of the Manila hemp fiber layer.

The basis weight of each of the layers of the multi-layer paper of the present invention varies with the function required for the tissue sheet obtained by the delamination and is not specifically limited. For example, when the tissue sheet is used as a porous substrate for heat-sensitive stencil printing masters, the basis weight is 1–20 g/m², preferably 1–10 g/m², from the standpoint of the function required for the porous substrate. A basis weight smaller than 1 g/m² results in low strength, whereas too large a basis weight in excess of 20 g/m² adversely affects the ink permeability.

In the case of 2-layer paper composed of a Manila hemp fiber layer and a polyester-fiber layer, it was found to be necessary that the basis weight of the Manila hemp fiber layer was at least 3 g/m² and the basis weight of the polyester fiber layer was at least 2 g/m² in order that each of the layer had a tensile strength of at least 30 N/m while ensuring peelability at the interface. Therefore, when a single-layer tissue sheet delaminated from a multi-layer paper is used for lamination with a thermoplastic resin film, it is preferred that the basis weight thereof be at least 3 g/m² when the layer is a cellulose-based layer and at least 2 g/m² when the layer is a synthetic resin fiber-based layer.

When a single-layer tissue sheet is delaminated from a multi-layer paper after a thermoplastic resin film has been bonded to the multi-layer paper, the basis weight of the tissue sheet can be small, since the thermoplastic resin film bonded thereto serves as a strength imparting support. Thus, when the tissue sheet is used as a porous support, for example, the basis weight thereof is preferably at least 1 g/m², more preferably at least 2 g/m², for obtaining satisfactory ink permeability.

Also when a tissue sheet is delaminated from a multi-layer paper as a laminated sheet with another layer, such another layer serves to function as a strength imparting support. Thus, the basis weight of the one layer can be about 1 g/m².

(5) Preparation of Multi-layer Papers (VI)–(X):

60 Mass % of non-stretched polyester fibers (TEPYRUS TKO8PN manufactured by Teijin Ltd.) having a fineness of 0.2 dtex and a length of 3 mm were mixed with 40 mass % of polyester binder fibers (sheath component: low melting point PET, fusion temperature: 110° C.; core component: PET; SOFIT N720 manufactured by Kuraray Co., Ltd.) having a fineness of 1.7 dtex and a length of 5 mm to obtain a stock. Using this stock, a polyester fiber layer was formed on a wire of a TAPPI standard sheet machine in an amount corresponding to a basis weight of 5 g/m² and was picked up on a filter paper. A Manila hemp pulp was beaten to Canadian Standard freeness (CSF) 550 to obtain a stock. Using this stock, a Manila hemp fiber layer was formed on a wire of a TAPPI standard sheet machine in an amount corresponding to a basis weight of 8 g/m². This was superimposed by picking up on the wet polyester fiber layer on the filter paper. The resulting combined sheet was pressed for dewatering and dried on a cylindrical drier having surface temperatures of 85° C., 90° C., 100° C., 105° C. and 110° C. to obtain 2-layer papers (VI)–(X), respectively. The peel strengths of the 2-layer papers (VII)–(VIII) obtained at drying temperatures of 90–105° C. ranged 1.76–1.97 N/m and delamination at the interface was uniformly made. In the case of the 2-layer paper (VI) obtained at a drying temperature of 85° C., breakage of the material of the polyester fiber layer occurred. In the case of the 2-layer paper (X) obtained at a drying temperature of 110° C., delamination caused breakage of the sheet and considerable fuzzing so that uniform delamination at the interface was not able to be made. Thus, the drying temperature for 2-layer paper composed of the polyester fiber layer and the Manila hemp pulp layer in the range of 90–105° C. was found to be desirable. This range was lower by 5° C. than the binding temperature of the binder fibers.

(6) Preparation of Multi-layer Paper (XI):

Using 100 mass % of polyester binder fibers (sheath component: low melting point PET, fusion temperature: 110° C.; core component: PET; MELTY 4080 manufactured by Unitika Ltd.) having a fineness of 1.7 dtex and a length of 5 mm as a stock, a polyester fiber layer was formed on a wire of a TAPPI standard sheet machine in an amount corresponding to a basis weight of 15 g/m² and was picked up on a filter paper. Using 100 mass % of polyolefin binder fibers (sheath component: low melting point PE, fusion temperature: 110° C.; core component: PP; EAC manufactured by Chisso Inc.) having a fineness of 2.2 dtex and a length of 5 mm as a stock, a polyolefin fiber layer was formed on a wire of a TAPPI standard sheet machine in an amount corresponding to a basis weight of 15 g/m². This was superimposed by picking up on the wet polyester fiber layer previously picked up on the filter paper. The resulting combined sheet was pressed for dewatering and dried on a cylindrical drier for experimental use at 105° C. to obtain a 2-layer paper (XI) having a polyester fiber layer and a polyolefin fiber layer. The peel strength of the 2-layer paper was found to be 2.3 N/m in the combined interface. Delamination was uniformly occurred.

(7) Preparation of Multi-layer Paper (XII):

Using 100 mass % of polyester binder fibers (sheath component: low melting point PET, fusion temperature: 110° C.; core component: PET; MELTY 4080 manufactured by Unitika Ltd.) having a fineness of 1.7 dtex and a length of 5 mm as a stock, a polyester fiber layer was formed on a wire of a TAPPI standard sheet machine in an amount corresponding to a basis weight of 15 g/m² and was picked up on a filter paper. Using 100 mass % of binder fibers having ethylene/vinyl acetate as a sheath component (fusion temperature: 100° C.; core component: PP; NBF(E) manufactured by Daiwabo Co., Ltd.) having a fineness of 2.2 dtex and a length of 5 mm as a stock, a binder fiber layer having a polyolefin resin core component was formed on a wire of a TAPPI standard sheet machine in an amount corresponding to a basis weight of 15 g/m². This was superimposed by picking up on the wet polyester fiber layer previously picked up on the filter paper. The resulting combined sheet was pressed for dewatering and dried on a cylindrical drier for experimental use at 105° C. to obtain a 2-layer paper (XII) having a polyester fiber layer and a polyolefin fiber layer. The peel strength of the 2-layer paper was found to be 7.8 N/m in the combined interface. Delamination was uniformly occurred.

(8) Preparation of Multi-layer Paper (XIII):

Using a Manila hemp pulp beaten to Canadian Standard freeness (CSF) 670 as a stock, a Manila hemp fiber layer was formed on a wire of a TAPPI standard sheet machine in an amount corresponding to a basis weight of 20 g/m² and was picked up on a filter paper. Using 100 mass % of polyolefin binder fibers (sheath component: low melting point PE, fusion temperature: 110° C.; core component: PP; EAC manufactured by Chisso Inc.) having a fineness of 2.2 dtex and a length of 5 mm as a stock, a polyolefin fiber layer was formed on a wire of a TAPPI standard sheet machine in an amount corresponding to a basis weight of 20 g/m². This was superimposed by picking up on the wet Manila hemp fiber layer previously picked up on the filter paper. The resulting combined sheet was pressed for dewatering and dried on a cylindrical drier for experimental use at 105° C. to obtain a 2-layer paper (XIII) having a polyester fiber layer and a Manila hemp fiber layer. The peel strength of the 2-layer paper was found to be 1.2 N/m in the combined interface. Delamination was uniformly occurred.

From the above results, for the production of a multi-layer paper having an interface having an interlayer peel strength of 10 N/m or less and showing good peelability, it is preferred that the drying temperature for the combined wet embryonic layers be lower by 5–20° C., more preferably 5–10° C., than the binder effect exhibition temperature of the binder fibers incorporated in the synthetic fiber-based layer.

In the production of Multi-layer Paper A in the manner described above, a surface of the multi-layer paper obtained from the unifying step by paper making method may be applied with a surface coating agent for paper making, if desired. In the case of a multi-layer paper composed of a layer composed mainly of cellulose fibers and unified with a layer composed mainly of synthetic fibers, a coating liquid containing starch or polyvinyl alcohol which is low in affinity with the synthetic fibers can improve the intralayer cohesive strength of the cellulose fiber-based layer and prevent fuzz and falling off of cellulose fibers without adversely affecting the peelability at the interface at which two layers are combined and is preferably used.

One of the most preferred construction of Multi-layer Paper A which has an interface having an interlayer peel strength of 10 N/m or less and which exhibits good peelablity uses a combination of a polyester fiber layer with a Manila hemp fiber layer. Fiber compositions of each of the fiber layers will be next described in more detail.

As described previously, Manila hemp fibers are most preferably used as the cellulose fibers. Manila hemp fibers beaten to provide CSF 550–730 are suitably used. The hemp fiber layer can contain semi-synthetic fibers such as rayon. When a tissue sheet formed of the hemp fibers is used as a porous support of a heat-sensitive stencil printing master, it is preferred that the hemp fiber layer contain a synthetic fibers, such as stretched polyester, vinylon or polyacrylonitrile, for reasons of improved dimensional stability against temperature changes of the stencil master. Because of a reduction of intralayer cohesive strength and resulting increase of dropping off of fibers, however, the amount of the synthetic fiber in the hemp fiber layer should be preferably not greater than 10% by weight. The hemp fiber layer can also contain binder fibers such as polyvinyl alcohol fibrous binder or binder fibers of a core-sheath structure capable of forming interfiber bonding by fuse bonding at fiber surfaces. The amount of the binder fibers should be preferably not greater than 10% by weight for reasons of the peel resistance.

As the polyester fiber used in the polyester fiber layer, there may be used a mixture of composite polyester fibers having fusible surfaces (generally called binder fibers) with stretched polyester fibers and/or non-stretched polyester fibers. These fibers are suitably selected from those having a diameter of 0.1–2.2 dtex. The binder fibers, which are preferably composite polyester fibers having a core-sheath structure, are preferably contained in the polyester fiber layer in an amount of 20–100 mass %. An amount of the binder fibers below 20 mass % fails to provide sufficient intralayer cohesive strength of the polyester fiber layer. The blending ratio, fiber diameter and fiber length of the stretched and non-stretched polyester fibers are suitably selected with the consideration of falling off of fibers and required function such as physical properties thereof which influence upon the image grade when used for a heat-sensitive stencil printing master. The stretched and non-stretched polyester fibers are preferably contained in the polyester fiber layer in an amount of 0–80 mass % in total. With regard to the blending ratio, the non-stretched polyester fibers, which exhibit a weak binding force at ordinary drying temperature and are effective in prevention of fuzz on a peeled surface and of falling off of fibers, are preferably used in an amount of 0–80 mass %. The stretched polyester fibers, which have no binding force and cause falling off of fibers from a peeled surface, are preferably used in an amount of 0–20 mass %. The length of the polyester fibers is 15 mm or less, preferably 10 mm or less, most preferably 5 mm or less, for reasons of dispersibility and texture.

In another embodiment of the present invention, there is provided a multi-layer paper comprising at least three paper layers each having a basis weight of 1–20 g/m². The multi-layer paper has, as an intermediate layer, at least one paper layer at which intralayer delamination can occur and at which the multi-layer paper is peelable into at least two tissue sheets. The multi-layer paper will be hereinafter referred to as "Multi-layer Paper B".

Multi-layer Paper B is peelable in the intralayer-delaminatable intermediate layer (hereinafter also referred simply to as "intermediate layer" to give tissue sheets of a number which is greater by 1 than the number of the intermediate layer.

The tissue sheets obtained by the delamination of Multi-layer Paper B may include a paper layer and an approximately half of the intermediate layer, or a plurality of paper layers and an approximately half of the intermediate layer. The number of the paper layers constituting Multi-layer Paper B is at least 3 inclusive of the number of the intermediate layer. The number of the intermediate layer is smaller by 1 than the number of the desired tissue sheets and is generally 1–3, preferably 1–2. The basis weight of each of the paper layers is suitably determined according to the intended use thereof and is generally 1–20 g/m², preferably 1–10 g/m². The basis weight of the paper layers other than the intermediate layer may be the same or different.

The peel strength of the paper layer interface of Multi-layer Paper B is generally greater than 10 N/m, preferably at least 20 N/m.

The intralayer peel strength of the intermediate layer is lower than that of the interface and is generally 10 N/m or less, preferably 6 N/m or less. The lower limit of the peel strength is about 0.5 N/m.

The intermediate layer may-be a paper layer composed mainly of cellulose fibers or a paper layer composed mainly of synthetic fibers.

In the case of the synthetic fiber-based intermediate paper layer, any synthetic fibers may be used without limitation because synthetic fibers hardly cause entanglement or binding between fibers. Synthetic fibers conventionally used as a porous support for a heat-sensitive stencil printing master, such as vinylon fibers, polyacrylonitrile fibers, polyamide fibers or polyester fibers may be used. Above all, the use of polyester fibers is preferred. The polyester fibers are preferably stretched fibers to which at least 10 mass % of non-stretched fibers are mixed. In order to prevent the intermediate layer from delaminating until up to a forced delamination step, it is necessary that at least 10 mass % of non-stretched fibers which have weak bonding force be used. The fiber length is preferably as short as possible. Especially preferred is the fiber length of 3 mm or less. The peel strength of the intermediate layer is such that delamination of the multi-layer paper at the intermediate layer does not easily occur during handling thereof.

The basis weight of the intermediate layer of synthetic fibers such as polyester fibers is generally 2–8 g/m², preferably 2–6 g/m², more preferably 2–4 g/m².

In the case of the cellulose fiber-based intermediate paper layer, the use of semi-synthetic fibers e.g. rayon fibers or Lyocell fibers or mercerized Manila hemp fibers or hardwood pulp fibers is preferable for reasons of reduced entanglement or binding between fibers. When ordinary Manila hemp fibers which have not been subjected to a mercerization treatment are used, it is desired that the pulp fiber be not subjected to a beating treatment but be only subjected to disintegration. The fiber length is preferably as short as possible. Especially preferred is the fiber length of 2 mm or less. It is preferred that the intermediate layer composed mainly of cellulose fibers contain a releasing agent.

The basis weight of the intermediate layer of cellulose fibers is generally 5–10 g/m², preferably 5–8 g/m², more preferably 5–6 g/m².

In order to increase the bonding strength in the interface between the intermediate layer and each adjacent layer, it is necessary to incorporate fibers exhibiting high binder function into each adjacent layer and to provide the binding force in the interface. It is preferred that the binder fibers incorporated into each adjacent layer have high affinity with the fibers of the intermediate layer. For example, when the intermediate layer is composed mainly of polyester fibers, the binder fibers incorporated into each adjacent layer are preferably polyester composite fibers. When the layers adjacent to the intermediate layer are composed mainly of cellulose fibers, the use of polyvinyl alcohol fibrous binder is generally preferred for reasons of high bonding strengths. However, for use in heat-sensitive stencil printing masters, the use of polyester composite fibers is preferable for reasons of resolution. The use of heat-fusible composite fibers such as polyester composite fibers is preferred, since the bonding strength in the interface increases when the combined sheet is dried at a temperature of the fusion temperature or higher. When the intermediate layer is formed of polyester fibers and its adjacent layers are composed mainly of cellulose fibers, it is possible to increase the peel strength in the interface by incorporating polyester composite fibers in the cellulose-fiber based paper layer and by drying at a temperature higher than the fusion temperature thereof. The length of the binder fibers is preferably large, because the greater the length of the binder fibers, the higher becomes the bonding strength at the interface.

The thickness of the intermediate layer is not desired to be excessively large or small, but is desired to be in a suitable range. Although the intralayer peel resistance becomes low with an increase of the thickness of the intermediate layer, too large a thickness thereof is undesirable because the intralayer delamination occurs at various location so that the thickness of the delaminated layers becomes undesirably non-uniform. Too small a thickness, on the other hand, causes an increase of the peel resistance in the intermediate layer and the intralayer delamination cannot occur, because the binding force of the binder fibers contained in the adjacent layers reaches inside of the intermediate layer. The diameter of the fibers of the intermediate layer is preferably small, because the smaller the diameter of the fibers, the less becomes the influence of the binding force of the binder fibers contained in the adjacent layers and, hence, the thickness of the intermediate layer can be reduced.

The binder fibers incorporated into the paper layers adjacent to the intermediate layer exhibit the binder effect at the previously described drying temperature. When the adjacent layers are composed of synthetic fibers, the amount of the binder fibers incorporated into the synthetic fibers is 20–100 mass %, preferably at least 30 mass %, more preferably at least 40 mass %, in the case of composite binder fibers. In the case of single-component binder fibers, the amount is 20–70 mass %, preferably 60 mass % or less, more preferably 50 mass % or less.

The composite binder fibers and single-component binder fibers can be those described above with reference to Multi-layer Paper A.

Multi-layer Paper B is preferably a 3-layer paper in which intralayer delamination occurs in the intermediate layer. Such a multi-layer paper (3-layer paper) has a basis weight of 4–40 g/m², preferably 4–20 g/m². In this case, each of two tissue sheets (tissue papers) obtained therefrom by intralayer delamination is composed of one layer and the nearly halved intermediate layer and has a basis weight of 2–20 g/m², preferably 3–10 g/m². Such small basis weight tissue sheets are suitably used as a support for a thermoplastic resin film of a heat-sensitive stencil printing master.

Multi-layer Paper B is also preferably a 4-layer paper in which intralayer delamination occurs in the second or third paper layer (intermediate layer). Such a multi-layer paper (4-layer paper) has a basis weight of 5–70 g/m², preferably 6–40 g/m². In this case, one of two tissue sheets obtained therefrom by intralayer delamination is composed of one layer and the nearly halved intermediate layer, while the other tissue sheet is composed of two paper layers and the intermediate layer divided nearly into halves. The former tissue sheet has a basis weight of 2–25 g/m², preferably 2–15 g/m², while the latter tissue sheet has a basis weight of 3–45 g/m², preferably 4–25 g/m² and is easy to handle because of its stiffness. In the latter tissue paper, one of the two layers other than the nearly halved intermediate layer serves to function as a support for reinforcing the whole tissue sheet.

Multi-layer Paper B is also preferably a 5-layer paper in which intralayer delamination occurs in one of the second, third and fourth paper layers (intermediate layer) or in each of the second and fourth paper layers. Such a multi-layer paper (5-layer paper) has a basis weight of 6–80 g/m$^2$, preferably 7–30 g/m$^2$. In this case, two, first and second tissue sheets may be obtained by intralayer delamination at the second layer. The first tissue sheet is composed of the first paper layer and the nearly halved second paper layer, while the second tissue sheet is composed of the third, fourth and fifth paper layers and the nearly halved second paper layer. Also, by intralayer delamination at the third layer of the 5-layer paper, there can be obtained two, first and second tissue sheets each composed of two paper layers and nearly halved third layer. Further, two, first and second tissue sheets may be obtained by intralayer delamination at the fourth layer. The first tissue sheet is composed of the first, second and third paper layers and the nearly halved fourth paper layer, while the second tissue sheet is composed of the fifth paper layer and the neatly halved fourth paper layer. Further, three, first, second and third tissue sheets may be obtained by intralayer delamination at the second and fourth layers. The first tissue sheet is composed of the first paper layer and the nearly halved second paper layer, and third tissue sheet is composed of the fifth paper layer and the nearly halved fourth paper layer. The second tissue sheet is composed of the third paper layer and the nearly halved second and fourth paper layers.

Multi-layer Paper B may be prepared by the conventional paper making method similar to Multi-layer Paper A. In the paper making method, at least three wet paper layers are combined and then dried for unification. The wet layers correspond to respective paper layers constituting Multi-layer Paper B.

The production of Multi-layer Paper B will be described more concretely below.

(I) Preparation of Multi-layer Paper Having Intermediate Layer Including Manila Hemp Fibers:

A slurry as a stock for the intermediate layer was prepared by disintegrating a Manila hemp pulp sheet without beating (average fiber length: 4.3 mm). Also prepared was a slurry as a stock for the intermediate layer by cutting a Manila hemp pulp sheet with a razor into small squares of about 1 mm side length, followed by disintegration (average fiber length: 1.3 mm). As a stock for forming first and third layers to be disposed adjacent to the intermediate layer, also prepared was a slurry containing 60 mass % of non-stretched polyester fibers (TK08PN manufactured by Teijin Ltd.) having a fineness of 0.2 dtex and a length of 3 mm and 40 mass % of polyester binder fibers (sheath component: low melting point PET, fusing temperature: 110° C.; core component: PET; MELTY 4080 manufactured by Unitika Ltd.) having a fineness of 1.7 dtex and a length of 5 mm, to which an acrylamide-type dispersing agent (ACRYPERSE P-NS manufactured by Diafloc Co., Ltd.) was added in an amount of 0.3% based on the weight of the fibers. Using a TAPPI standard sheet machine, a polyester fiber layer having a basis weight of 6 g/m$^2$ was formed as the first layer, a Manila hemp fiber intermediate layer having a basis weight of 3, 5, 8, 10 or 15 g/m$^2$ was formed as the second layer, and a polyester fiber layer having a basis weight of 6 g/m$^2$ was formed as the third layer. These layers were unified by paper making such that the wet second layer was superimposed on the surface of the wet first layer picked up on a filter paper, on which the wet third layer was superimposed by picking up. The resulting combined sheet was pressed for dewatering and dried on a cylindrical drier for experimental use at 110° C. to obtain a 3-layer paper having the Manila hemp fiber intermediate layer interposed between two polyester fiber layers. The intralayer peel strength was measured by delamination in the intermediate layer. The peel resistance of the intermediate layer composed of the Manila hemp fibers having an average fiber length of 4.3 mm was found to be lowered as the basis weight increased. In this case, the peel strength of the intermediate layer was greater than 10 N/m even when the basis weight was 15 g/m$^2$. Thus, the delamination was not able to be carried out in a stable manner and variation of the thickness of the delaminated sheets was large. On the other hand, the peel resistance of the intermediate layer composed of the Manila hemp fibers having an average fiber length of 1.3 mm was found to be 20 N/m when the basis weight was 3 g/m$^2$. However, the peel resistance decreased to 9.6 N/m, 6.5 N/m, 5.5 N/m and 5 N/m, when the basis weight increased to 5 g/m$^2$, 8 g/m$^2$, 10 g/m$^2$ and 15 g/m$^2$, respectively. Thus, delamination was able to be performed in a stable manner when the basis weight was in the range of 5 g/m$^2$ to 10 g/m$^2$. Similar peel resistance was also obtained, when the basis weight was above 10 g/m$^2$. When the basis weight was 15 g/m$^2$, however, variation in the thickness of the tissue sheets obtained by the delamination was disadvantageously large.

(II) Preparation of Multi-Layer Paper Having Intermediate Layer Including Polyester Fibers (1):

A slurry containing 90 mass % of stretched polyester fibers (TM04PN manufactured by Teijin Ltd.) having a fineness of 0.1 dtex and a length of 3 mm were mixed with 10 mass % of non-stretched polyester fibers (TK08PN manufactured by Teijin Ltd.) having a fineness of 0.2 dtex and a length of 3 mm to prepare a stock for forming an intermediate layer. Using this slurry in amounts corresponding to the basis weights of 1, 2, 5, 6, 8, 10 and 15 g/m$^2$, 3-layer papers were prepared in the same manner as that described (I) immediately above. The thus obtained 3-layer papers were measured for the peel resistance at their intermediate layers. When the basis weight was 1 g/m$^2$, the peel strength was 20 N/m so that the intralayer delamination was not able to be performed. However, the peel resistance decreased to 10.0 N/m, 1.3 N/m, 0.6 N/m, 0.5 N/m, 0.5 N/m and 0.5 N/m, when the basis weight increased to 2 g/m$^2$, 5 g/m$^2$, 6 g/m$^2$, 8 g/m$^2$, 10 g/m$^2$ and 15 g/m$^2$, respectively. Thus, the peel resistance was nearly constant when the basis weight was 5 g/m$^2$ or more. The delamination occurred in a stable manner along a plane bisecting the intermediate layer having a basis weight of 2 g/m$^2$ to 8 g/m$^2$. When the basis weight was 10 g/m$^2$ or more, however, the delamination was not able to be performed in a stable manner so that the variation in the thickness of the tissue sheets was large.

(III) Preparation of Multi-Layer Paper Having Intermediate Layer Including Polyester Fibers (2), (3):

A slurry containing 100 mass % of non-stretched polyester fibers (TK08PN manufactured by Teijin Ltd.) having a fineness of 0.2 dtex and a length of 3 mm was prepared to form a stock for an intermediate layer. Using this slurry in an amount corresponding to the basis weight of 6 g/m$^2$, a 3-layer paper was prepared in the same manner as that described (I) above. Also prepared was a slurry containing 85 mass % of stretched polyester fibers (TM04PN manufactured by Teijin Ltd.) having a fineness of 0.1 dtex and a length of 3 mm and 15 mass % of polyester binder fibers (sheath component: low melting point PET, fusing temperature: 110° C.; core component: PET; MELTY 4080 manufactured by Unitika Ltd.) having a fineness of 1.7 dtex and a length of 5 mm. Using this slurry in an amount corresponding to the basis weight of 6 g/m², a 3-layer paper was prepared in the same manner as that described (I) above.

The thus obtained two sheets of 3-layer papers were measured for the peel resistance at their intermediate layers. When the intermediate layer was composed of the 100 mass % non-stretched polyester fibers, the peel strength was 7.5 N/m so that the intralayer delamination was performed in a stable manner. When the intermediate layer contained binder fibers, however, the 3-layer paper was tightly integrated so that delamination was not able to be performed.

From the above results, the suitable range of the basis weight of Multi-layer Paper B having an intralayer-peelable intermediate layer is 2–8 g/m², preferably 2–6 g/m², more preferably 2–4 g/m², when the intermediate layer is composed mainly of polyester fibers, and 5–10 g/m², preferably 5–8 g/m², more preferably 5–6 g/m², when the intermediate layer is composed mainly of cellulose fibers.

According to the present invention, tissue sheets having a low basis weight may be obtained by using the above-described Multi-layer Paper A and Multi-layer Paper B. In this case, the term "tissue sheet" is intended to refer to a tissue paper obtained from Multi-layer Paper A or Multi-layer Paper B by delamination. The tissue sheet obtainable from Multi-layer Paper A is a single-layer-sheet or a multi-layer sheet. The tissue sheet obtainable from Multi-layer Paper B is composed of a single-layer sheet and a nearly halved intermediate layer or of a multi-layer sheet and a nearly halved intermediate layer.

A method of preparing tissue sheets by using Multi-layer Paper A and Multi-layer Paper B according to the present invention will be next described with reference to FIG. 1.

Figure 1:
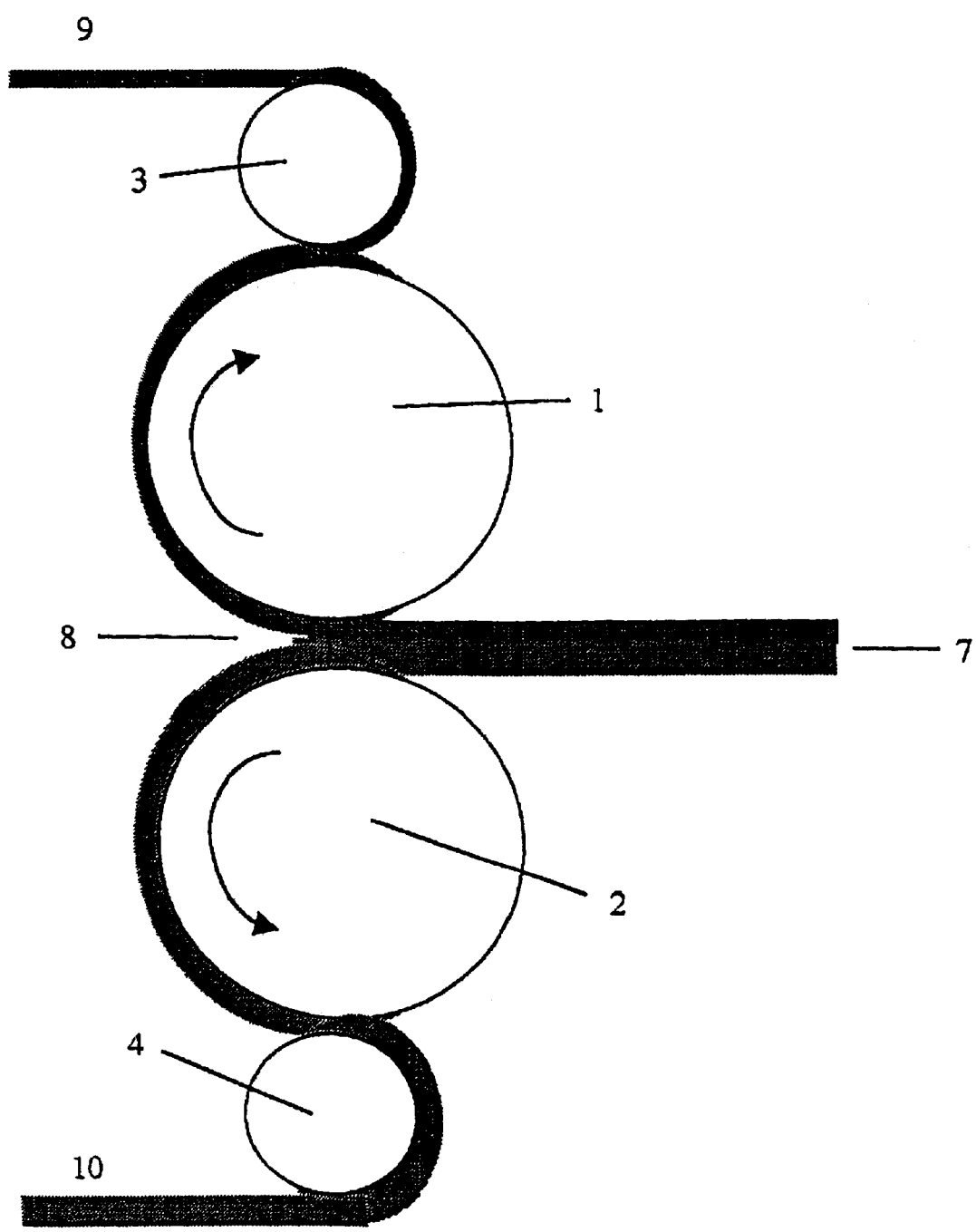
FIG. 1 is a schematic illustration of a multi-layer paper according to the present invention which is being delaminated with a delamination device.

FIG. 1 schematically illustrates a delamination device. In FIG. 1, the reference numberals 1 and 2 denote rollers, 3 and 4 denote backing rolls, 5 a multi-layer paper, 8 a peeling section and 9 and 10 denote tissue sheets. A peelable multi-layer paper 7 supplied from a feed part is passed through a uniform low pressure nip 5 (not shown) formed between at least two parallel horizontal rolls 1 and 2 and is delaminated at a peelable portion of the multi-layer paper into the two tissue sheets 9 and 10 when discharged from a substantially outlet of the nip. The thus obtained tissue sheets 9 and 10 are displaced at a speed equal to the speed of the roll with their whole widths being maintained in contact with respective rolls, and wound around respective take-up rolls 6, 6' (not shown).

The two, upper and lower horizontal rolls preferably have associated backing rolls 3 and 4 for preventing departure of tissue sheets from roll surfaces during transportation and for stabilizing the position of the peeling section. In this case, the tension applied to the tissue sheets 9 and 10 is greater than 10 N/m and is controlled below the elastic limit of their tensile strengths. It is preferred that the tissue sheets thus obtained by delamination be subjected to a heat calendar treatment for removing fuzz of the surfaces thereof and falling off of the fibers from the surfaces thereof. In this case, the thermal calendar treatment is preferably carried out before the two tissue sheets 9 and 10 have been wound around the take-up rolls 6 and 6'. In place of the thermal calendaring treatment, a resin coating method using, for example, an urethane resin may be adopted for removing fuzzing of the surfaces thereof and falling off of the fibers from the surfaces thereof. When the tissue sheets are obtained by intralayer delamination of the intermediate layer having a peel strength of 10 N/m or less, fuzz of the peeled surfaces and falling off of fibers therefrom occur significantly. In such a case, the resin coating method using, for example, an urethane resin is effective.

According to the present invention, there is provided a reinforced multi-layer paper material having a reinforcing member bonded to one or both sides of the above-described Multi-layer Paper A or Multi-layer Paper B. By using the reinforcing member, it is possible to prepare reinforcing member-bonded tissue sheets with high productivity at low costs in a stable manner.

From the above reinforcing member-multi-layer paper laminate, a tissue sheet reinforced by the reinforcing member may be prepared by simply delaminating the reinforcing member-multi-layer paper laminate to separate the tissue sheet reinforced by the reinforcing member using the delamination device shown in FIG. 1.

Namely, by using the above reinforcing member-multi-layer paper laminate having the reinforcing member provided on one side of the multi-layer paper in lieu of the multi-layer paper 7 in FIG. 1, reinforcing member-multi-layer paper laminate 9 may be obtained. By using the laminate having the reinforcing member provided on each side of the multi-layer paper, reinforcing two, member-multi-layer paper laminates 9 and 10 may be obtained.

Any conventionally employed reinforcing member, such as a polymer film or a metal foil (e.g. aluminum foil or copper foil), may be used. The polymer film may be, for example, a thermoplastic resin film or a thermosetting resin film and has a thickness of generally 1–100 μm, though the thickness varies with the intended use. The polymer film may be a non-porous film or a porous film.

According to the present invention, a high quality product of a heat-sensitive stencil printing master of a type in which a thermoplastic polymer (resin) film is bonded on a porous support may be obtained, when the above-described tissue sheet is used as the porous support.

The tissue sheet used as a porous support of a heat-sensitive stencil printing master may be a single-layer sheet or a multi-layer tissue sheet and has a basis weight of 1–20 g/m², preferably 1–10 g/m².

According to the present invention, a substrate having a low basis weight may be prepared with high productivity and at low costs by using the above multi-layer paper as a porous support material for producing a heat-sensitive stencil printing master.

According to the present invention, a heat-sensitive stencil printing master having a low basis weight may be prepared with high productivity and at low costs by using a laminate obtained by bonding a thermoplastic polymer film to at least one side of the multi-layer paper.

According to the present invention, a high quality, heat-sensitive stencil printing master comprising a porous support, and a thermoplastic polymer film bonded to the porous support may be prepared with high productivity and at low costs by using the above-described tissue paper as the support.

According to the present invention, a heat-sensitive stencil printing master may be prepared with high productivity and at low costs by a step of separating a tissue sheet from the above-described porous support material, and a step of bonding a thermoplastic polymer film to the peeled surface of the separated tissue sheet.

According to the present invention, a heat-sensitive stencil printing master may be prepared with high productivity and at low costs by separating, from the above-described material for producing a heat-sensitive stencil printing master, a laminate having the thin sheet to which the thermoplastic polymer film has been bonded.

The thermoplastic polymer film may be bonded to Multi-layer Paper A or B by any conventional method such as a bonding method using an adhesive or a bonding method using melt adhesion.

Any known thermoplastic resin film conventionally used for use in the heat-sensitive stencil printing master according to the present invention, such as polyester, polyamide, polypropylene, polyethylene, polyvinyl chloride or polyvinylidene chloride may be used for the purpose of the present invention. For reasons of perforation sensitivity, a polyester film is especially preferably used.

As preferred polyesters for the polyester film, there may be mentioned polyethylene terephthalate, copolymers of ethylene terephthalate with ethylene isophthalate and copolymers of hexamethylene terephthalate with cyclohexanedimethylene terephthalate. Especially preferably used for reasons of improved perforation sensitivity are copolymers of ethylene terephthalate with ethylene isophthalate and copolymers of hexamethylene terephthalate with cyclohexanedimethylene terephthalate.

The thermoplastic resin film may contain a flame retardant, a heat stabilizer, an oxidation preventing agent, a UV absorbing agent, an antistatic agent, a pigment, a dye an organic lubricant (e.g. a fatty acid ester or wax) and an antifoaming agent (e.g. polysiloxane), if necessary. A slippage may be imparted to the thermoplastic resin film. As a method for imparting the slippage, there may be mentioned a method in which inorganic particles such as clay, mica, titanium oxide, calcium carbonate, kaolin, talc and silica or organic particles such as polyacrylic acid and polystyrene are incorporated or a method in which a surfactant is applied to a surface of the film.

The thickness of the thermoplastic resin film is generally preferably 0.1–5.0 $\mu$m, more preferably 0.1–3.0 $\mu$m. When the thickness exceeds 5.0 $\mu$m, the perforation characteristics may become sometimes poor. Too small a thickness below 0.1 $\mu$m may sometimes adversely affect stability in the film forming properties and printing resistance.

For bonding the thermoplastic resin film to the tissue sheet, a method using an adhesive is preferable. As the adhesive, there may be mentioned a vinyl acetate-based adhesive, an acrylic adhesive, a polyester-based adhesive, an urethane-based adhesive, an epoxy-based adhesive, an EVA-based adhesive and an ionizing radiation-type adhesive.

The amount of the adhesive applied is suitably 0.1 g/m$^2$ to 3.0 g/m$^2$, preferably 0.2 g/m$^2$ to 1.5 g/m$^2$ on the dry basis.

When the delamination for the preparation of a heat-sensitive stencil printing master using a laminate of a polymer film and a multi-layer paper is carried out in the unified interface of the multi-layer sheet after the thermoplastic resin film has been bonded to the multi-layer paper and when the adhesive layer penetrates into the paper layer interface of the multi-layer paper, there is a possibility that the delamination cannot easily occur. Therefore, the coating must be carried out using an adhesive whose viscosity is such that the adhesive does not penetrates into the paper layer interface of the multi-layer paper. In the case where the intralayer delamination is conducted in the intermediate layer, too, the coating must be carried out using an adhesive whose viscosity is such that the adhesive does not penetrates into the intermediate paper layer of the multi-layer paper. The viscosity of the adhesive is thus to be suitably selected and controlled by dilution with a solvent or by heating. The controlling method is not specifically limited, however.

The adhesive may be incorporated with an antistatic agent, if desired. Illustrative of suitable antistatic agents are cation, anion, noion, amphoteric; carbon; and electrically conducting materials.

It is preferred that a thin layer containing ingredients such as a silicone oil, a silicone resin, a fluorine-containing resin, a surfactant, an antistatic agent, a heat resisting agent, an oxidation preventing agent, organic particles, inorganic particles, a pigment, a dispersion aid, an antiseptic agent and a antifoaming agent, be formed on that surface of the heat-sensitive stencil printing master which is to be contacted with a thermal head for the purpose of preventing melt-adhesion during perforation. The melt-adhesion preventing thin layer preferably has a thickness of 0.005–0.4 $\mu$m, more preferably 0.01–0.4 $\mu$m.

A method of forming a thin layer for the prevention of melt-adhesion of a heat-sensitive stencil printing master of the present invention is not specifically limited. One preferred method includes applying a solution of the adhesive diluted with water or a solvent with a coater such as a roll coater, a gravure coater, reverse coater or bar coater, followed by drying.

Next, a method of preparing a heat-sensitive stencil printing master using a laminate of a polymer film and a multi-layer paper as a material for the preparing the heat-sensitive stencil printing master will be described in detail with reference to the drawings.

Figure 2:
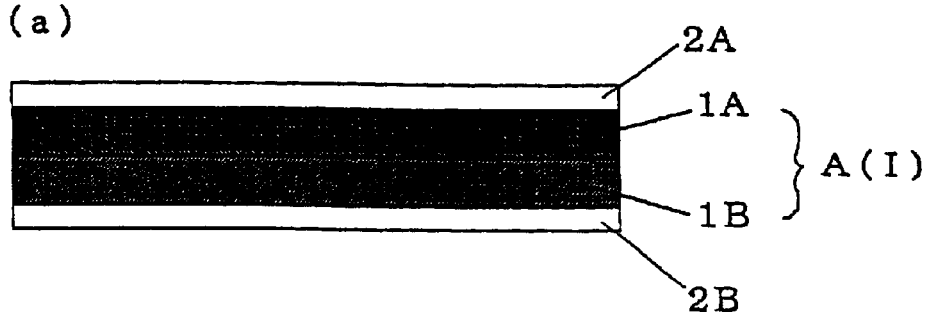
FIG. 2(a) is a sectional view schematically illustrating a polymer film-Multi-layer Paper A laminate formed by bonding a polymer film to each of the both sides of Multi-layer Paper A.
FIG. 2(b) is a schematic illustration of the laminate of FIG. 2(a) being delaminated-at the peelable interface.
Figure 2:
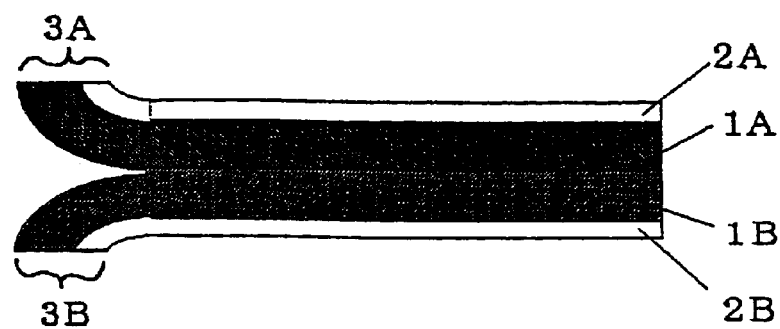

FIG. 2(a) depicts a laminate of a polymer film and Multi-layer Paper A obtained by a method including combining two wet embryonic layers by paper making, drying the combined sheet to obtain a multi-layer paper (2-layer paper) A(I) composed of a paper layer 1A and a paper layer 1B, laminating a polymer film 2A on one side thereof, and laminating a polymer film 2B on the other side thereof.

For the preparation of heat-sensitive stencil printing masters from the thus obtained laminate, the multi-layer paper A(I) is delaminated, as shown in FIG. 2(b), at the peelable interface between the paper layer 1A and the paper layer 1B, thereby obtaining a master paper 3A having the polymer film 2A formed on the paper layer 1A and a master paper 3B having the polymer film 2B formed on the paper layer 1B.

Figure 3:
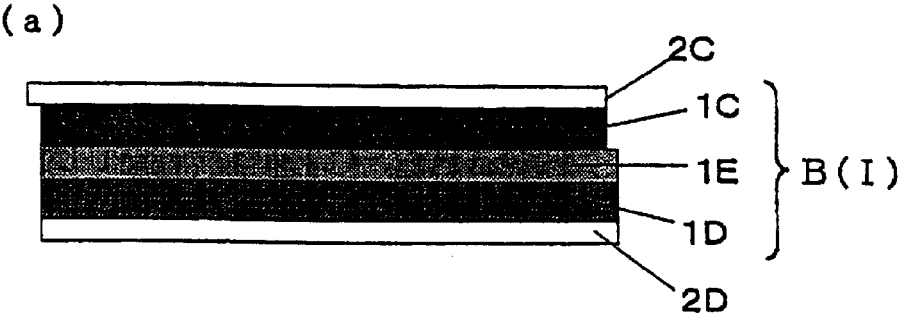
FIG. 3(a) is a sectional view schematically illustrating a polymer film-Multi-layer Paper B laminate formed by bonding a polymer film to each of the both sides of Multi-layer Paper B.
FIG. 3(b) is a schematic illustration of the laminate of FIG. 3(a) being delaminated at the intralayer peelable intermediate layer.
Figure 3:
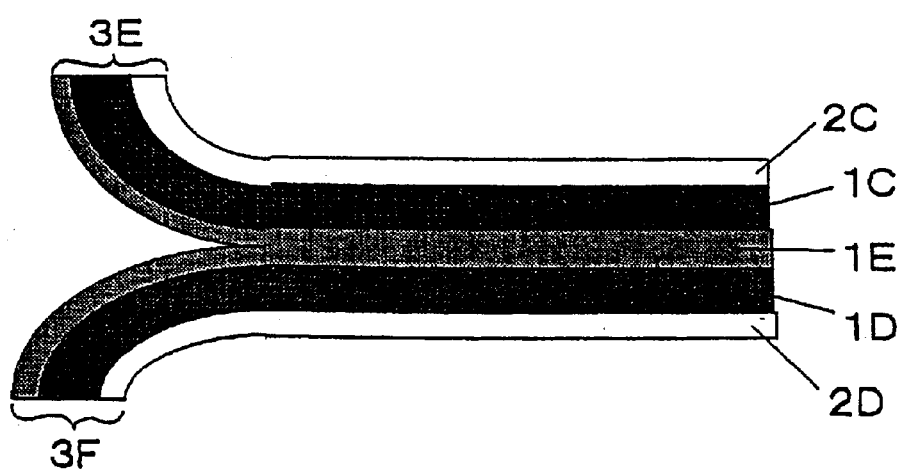

FIG. 3(a) depicts a laminate of a polymer film and Multi-layer Paper B obtained by a method including combining three wet embryonic layers by paper making, drying the combined sheet to obtain a multi-layer paper (3-layer paper) B(I) composed of a paper layer 1C, a paper layer 1E and a paper layer 1D, laminating a polymer film 2C on one side thereof, and laminating a polymer film 2D on the other side thereof.

For the preparation of heat-sensitive stencil printing masters from the thus obtained laminate, the multi-layer paper B(I) is delaminated, as shown in FIG. 3(b), at the intralayer peelable paper layer 1E, thereby obtaining a master paper 3E having the polymer film 2C formed on the paper layer 1C and a master paper 3F having the polymer film 2D formed on the paper layer 1D.

EXAMPLES

The present invention will be described by examples but is not limited thereto. Peel strength in Examples and Comparative Examples is evaluated according to the following method.

Peel Strength Evaluating Method:

A sample sheet used for evaluating the peel strength in the interface at which two layers are combined by paper making and in an intermediate layer of a multi-layer paper has a size of 15 mm×150 mm with the lengthwise direction of the sample coinciding with the machine direction. An edge portion (about 20 mm) of one end of the sample is manually peeled at an interface or internally within an intermediate layer and the peeled portions are folded outward so that the sample is shaped into a T-like form. Folded portions are held by grips of a constant speed-type tensile tester (Tensilon manufactured by Toyo Measuring Instrument Co., Ltd.) which grips are spaced apart a distance of 25 mm from each other. The grips are then displaced in opposite directions at a displacing rate of 300 mm/minute while recording the peel strength by the tester. During the displacement of the grips, the non-peeled portion of the sample is supported by fingers and maintained in a T-shaped form. The load (N) for peeling at a point in time where about 50 mm portion of the sample has been peeled from the start of the displacement of the grips is determined by optimum linear method. The peel strength (N/m) is obtained by dividing such a load by the width of the sample. The moisture control and measurement for the sample was carried out in a thermostatic chamber at a temperature of 23° C. and a relative humidity of 50%.

Example 1 and Comparative Example 1

A Manila hemp pulp was beaten to obtain a stock having Canadian Standard freeness (CSF) 680. A layer of the furnish formed on a wire of a TAPPI standard sheet machine was picked up on a filter paper in an amount corresponding to a basis weight of 10 g/m². Similar two layers were formed on separate filter papers. One of the wet layers was smoothed with a roll and was then combined with the other layer such that the smoothed surface was in contact with the other layer. The combined sheet was pressed for dewatering and dried on a cylindrical drier for an experiment use at 110° C. to obtain a two-layer paper. For the purpose of comparison, the above procedures were repeated in the same manner as described except that the smoothing treatment was not carried out, thereby obtaining a two-layer paper of Comparative Example 1. The peel strength of each of the above two-layer papers was measured. The two-layer paper of Example 1 which was subjected to a smoothing treatment was found to have a peel strength of 9.8 N/m. The two-layer paper was able to be separated uniformly at the interface therebetween. The peel strength of the two-layer paper of Comparative Example 1 was found to be 14 N/m. The paper was not able to be smoothly separated and caused partial breakage of the paper layers.

Example 2

60 Mass % of non-stretched polyester fibers (TEPYRUS TKO8PN manufactured by Teijin Ltd.) having a fineness of 0.2 dtex and a length of 3 mm were mixed with 40 mass % of polyester binder fibers (sheath component: low melting point PET, fusing temperature: 110° C.; core component: PET; SOFIT N720 manufactured by Kuraray Co., Ltd.) having a fineness of 1.7 dtex and a length of 5 mm, to which an acrylamide-type dispersing agent (ACRYPERSE P-NS manufactured by Diafoc Co., Ltd.) was added in an amount of 0.3 mass % (based on total fibers) to obtain a stock for a first layer. The first layer of polyester fibers was formed on a wire of a TAPPI standard sheet machine in an amount corresponding to a basis weight of 5 g/m². A Manila hemp pulp was beaten to Canadian Standard freeness (CSF) 550 to obtain a stock for a second layer. The second layer of the Manila hemp fibers was formed on a wire of a TAPPI standard sheet machine in an amount corresponding to a basis weight of 8 g/m². Next, using the same stock as that of the first layer, a third layer of polyester fibers was formed on a wire of a TAPPI standard sheet machine in an amount corresponding to a basis weight of 5 g/m². These paper layers were then successively superimposed one over the other for unification by paper making. The unification by the paper making was carried out in the following manner. Thus, the first layer of the wet paper on the filter paper was overlaid with the second layer of the wet paper by picking up. The surface of the second layer was then overlaid with the third layer of the wet paper by picking up. The resulting combined wet sheet was pressed for dewatering and dried on a cylindrical drier at 105° C. for use in experiments, thereby to obtain a unified 3-layer paper according to the present invention having two polyester fiber layers between which the hemp fiber layer was interposed. The peel strength of the 3-layer paper was found to be 1.97 N/m between the first layer and the second layer and 2.11 N/m between the second layer and the third layer. By the peeling, three tissue sheets composed of two tissue sheets made of polyester fibers and one tissue sheet made of Manila hemp fibers were obtained. The physical properties of the three-layer paper and tissue sheets are shown in Table 1. Fuzz of the peeled surfaces and liberation of fibers from the layers were tolerable.

Preparation of Heat-Sensitive Stencil Printing Master:

A 5 mass % toluene solution of a polyester resin (ELEETEL 3500 manufactured by Unitika Ltd.) was applied in an amount of 0.5 g/m² (on dry basis) on one surface of a biaxially oriented polyester film having a thickness of 2.0 μm. The 3-layer paper obtained above was superimposed on the non-dried coating on the polyester film such that the first polyester fiber layer was contacted with the polyester coating. This was then dried with a dryer to obtain a laminate (material for preparing a heat-sensitive stencil printing master). The 3-layer paper of the laminate was peeled at the interface between the first and second layers to leave a laminate composed of the first layer and the film. A 1.0 mass % toluene solution of a silicone oil (SF8422 manufactured by Shinetsu Kagaku Co., Ltd.) was applied using a smooth bar to the other surface of the polyester film of the laminate and dried to form a melt-adhesion preventing layer thereon, thereby obtaining a heat-sensitive stencil printing master.

A second heat-sensitive stencil printing master which was a composite composed of a tissue paper of the second layer and a film was prepared in the same manner as described above except that the second layer from the remaining laminate composed of the second and third layers was superimposed on and bonded to a polyester film. Further, a third composite composed of a tissue paper of the third layer and a film was prepared in the same manner as described above except that the third layer was superimposed on and bonded to a polyester film such that the peeled surface of the third layer was in contact with the film.

Using the thus obtained three kinds of the heat-sensitive stencil printing masters, plating and printing were performed with a printer (VT2820 manufactured by Ricoh Company, Ltd.). The tissue papers of the polyester fibers layer were found to be usable as a porous support for so-called high grade images free of white spots. The tissue paper of the Manila hemp fiber layer was found to be usable for printing as a porous support for so-called low grade images though white spots were formed.

Example 3

Example 2 was repeated in the same manner as described except that the basis weight of the polyester fiber layers was reduced to 1 g/m$^2$ to obtain a unified 3-layer paper. A biaxially oriented polyester film having a thickness of 2.0 μm was bonded with an adhesive to each of the opposing surfaces of the 3-layer paper to obtain a laminate sheet (reinforced multi-layer paper material). The laminate sheet was found to be delaminatable at the interface between the first and second layers. The physical properties of the three-layer paper were as shown in Table 1.

Preparation of Heat-Sensitive Stencil Printing Master:

A 10 mass % ethyl acetate solution of a damp-setting type polyurethane resin (TAKENATE manufactured by Takeda Chemical Industries Ltd.) was applied in an amount of 0.4 g/m$^2$ (on dry basis) on one surface of a biaxially oriented polyester film having a thickness of 2.0 μm and dried with a dryer. This was then superimposed on the 3-layer paper obtained above such that the dried coating was contacted with the outer surface of the first layer of the 3-layer paper. The assembly was overlaid with a weight and allowed to stand at 40° C. for 2 days to perform curing. The 3-layer paper was peeled at the interface between the first layer and the second to leave a polyester-tissue paper laminate. A 1.0 mass % toluene solution of a silicone oil (SF8422 manufactured by Shinetsu Kagaku Co., Ltd.) was applied using a smooth bar to the other surface of the polyester film and dried to form a melt-adhesion preventing layer thereon, thereby obtaining a heat-sensitive stencil printing master. Using the thus obtained stencil printing master was perforated and printing was performed with a printer (Priport VT2820 manufactured by Ricoh Company, Ltd.). The stencil paper was found to have good ink permeability and to give prints without white spots.

Example 4

Example 2 was repeated in the same manner as described except that each of the polyester fiber layers was composed of 80 mass % of non-stretched polyester fibers (TKO8PN manufactured by Teijin Ltd.) having a fineness of 0.2 dtex and a length of 3 mm and 20 mass % of polyester binder fibers (sheath component: low melting point PET, fusing temperature: 110° C.; core component: PET; SOFIT N720 manufactured by Kuraray Co., Ltd.) having a fineness of 1.7 dtex and a length of 5 mm to obtain a 3-layer paper. The peel strength of the 3-layer paper was found to be 1.76 N/m between the first polyester fiber layer and the Manila hemp layer and 1.79 N/m between the second polyester fiber layer and the Manila hemp layer. The 3-layer paper was able to be uniformly separated into three tissue sheets, namely two polyester fiber tissue sheets and one Manila hemp sheet. The physical properties of the 3-layer paper and the tissue sheets are shown in Table 1. Fuzz of the peeled surfaces and liberation of fibers from the layers were more noticeable but was tolerable.

Example 5

Example 2 was repeated in the same manner as described except that each of the first and third polyester fiber layers was composed of 100 mass % polyester binder fibers (sheath component: low melting point PET, fusing temperature: 110° C.; core component: PET; SOFIT N720 manufactured by Kuraray Co., Ltd.) having a fineness of 1.7 dtex and a length of 5 mm to obtain a 3-layer paper. The peel strength of the 3-layer paper was found to be 2.26 N/m between the first polyester fiber layer and the hemp layer and 2.31 N/m between the second polyester fiber layer and the hemp layer. The 3-layer paper was able to be uniformly separated into three tissue sheets, namely two polyester fiber tissue sheets and one Manila hemp sheet. The physical properties of the 3-layer paper and the tissue sheets are shown in Table 1. Fuzz of the peeled surfaces and liberation of fibers from the layers were least noticeable. These tissue sheets were suitable as a porous support for heat-sensitive stencil printing master.

Preparation of Heat-Sensitive Stencil Printing Master:

Using the thus obtained three kinds of tissue sheets, three heat-sensitive stencil printing masters were prepared in the same manner as that in Example 2. Preparation of printing plates and printing using same were performed with a printer (Priport VT2820 manufactured by Ricoh Company, Ltd.). The tissue sheets of the polyester fiber layers were found to be usable as high grade porous supports without white spots. The tissue sheet of the Manila hemp fibers was found to be usable as a porous support for low grade images which gives suitable prints although white spots are formed.

Example 6

Example 2 was repeated in the same manner as described except that a mixture composed of 90 Parts by weight of Manila hemp pulp beaten to Canadian Standard freeness (CSF) 550 and 10 parts by weight of polyester binder fibers (sheath component: low melting point PET, fusing temperature: 110° C.; core component: PET; SOFIT N720 manufactured by Kuraray Co., Ltd.) having a fineness of 1.7 dtex and a length of 5 mm was used as the stock for the second layer to obtain a 3-layer paper. The peel strength of the 3-layer paper was found to be 5.49 N/m between the first polyester fiber layer and the hemp layer and 5.33 N/m between the second polyester fiber layer and the hemp layer, although peel strengths were slightly greater. The 3-layer paper was able to be uniformly separated into three tissue sheets, namely two polyester fiber tissue sheets and one tissue sheet composed of Manila hemp fibers mixed with the polyester binder fibers. The physical properties of the 3-layer paper and the tissue sheets are shown in Table 1. Fuzz of the peeled surfaces and liberation of fibers from the layers were most noticeable. The fuzz of the surface fibers and liberation of fibers no longer occurred when the tissue sheets were subjected to a hot calendaring treatment.

Comparative Example 2

Example 2 was repeated in the same manner as described except that the mixing ratio of the polyester binder fibers of the stock for the second layer was increased by 5 mass % to 15 mass %, thereby obtaining a 3-layer paper. The peel strength of the multi-layer paper was found to be 11.84 N/m between the first layer and the second layer and 11.99 N/m between the second layer and the third layer, namely in excess of the peel resistance limitation of 10 N/m. It was not possible to uniformly separate the multi-layer paper at each interface.

TABLE 1

| Example | | 2 | 3 | 4 | 5 | 6 | Comp. 2 |
|---|---|---|---|---|---|---|---|
| Synthetic fiber layer | PET binder fiber 1.7 dtex × 5 mm | 40% | 40% | 20% | 100% | 40% | 40% |
| | Non-stretched PET fiber 0.2 dtex × 3 mm | 60% | 60% | 80% | — | 60% | 60% |
| | Basis weight (g/m²) | 5.0 | 1.0 | 5.0 | 5.0 | 5.0 | 5.0 |
| Cellulose fiber layer | Manila hemp pulp | 100% | 100% | 100% | 100% | 90% | 85% |
| | PET binder fiber 1.7 dtex × 5 mm | — | — | — | — | 10% | 15% |
| | Basis weight (g/m²) | 8.0 | 8.0 | 8.0 | 8.0 | 8.0 | 8.0 |
| Synthetic fiber layer | PET binder fiber 1.7 dtex × 5 mm | 40% | 40% | 20% | 100% | 40% | 40% |
| | Non-stretched PET fiber 0.2 dtex × 3 mm | 60% | 60% | 80% | — | 60% | 60% |
| | Basis weight (g/m²) | 5.0 | 1.0 | 5.0 | 5.0 | 5.0 | 5.0 |
| Drying Temperature | ° C. | 105 | 105 | 105 | 105 | 105 | 105 |
| Multi-layer paper | Basis weight (g/m²) | 18.88 | 10.13 | 18.40 | 17.62 | 18.42 | 18.36 |
| | Density (g/cm³) | 0.321 | 0.290 | 0.333 | 0.259 | 0.318 | 0.312 |
| | Tensile strength (kN/m) | 0.66 | 0.41 | 0.71 | 0.61 | 0.67 | 0.67 |
| Synthetic fiber tissue sheet | Basis weight (g/m²) | 5.37 | — | 5.46 | 5.26 | 5.43 | — |
| | Density (g/cm³) | 0.190 | — | 0.226 | 0.159 | 0.200 | — |
| | Tensile strength (kN/m) | 0.134 | — | 0.102 | 0.160 | 0.130 | — |
| | Peel strength (N/m) | 1.97 | — | 1.76 | 2.26 | 5.49 | 11.84 |
| Cellulose fiber tissue sheet | Basis weight (g/m²) | 8.19 | — | 7.85 | 7.57 | 7.95 | — |
| | Density (g/cm³) | 0.273 | — | 0.278 | 0.277 | 0.272 | — |
| | Tensile strength (kN/m) | 0.255 | — | 0.240 | 0.238 | 0.265 | — |
| | Peel strength (N/m) | 2.11 | — | 1.79 | 2.31 | 5.33 | 11.99 |
| Synthetic fiber tissue sheet | Basis weight (g/m²) | 5.32 | — | 5.09 | 4.79 | 5.04 | — |
| | Density (g/cm³) | 0.190 | — | 0.224 | 0.158 | 0.198 | — |
| | Tensile strength (kN/m) | 0.134 | — | 0.099 | 0.155 | 0.126 | — |

Example 7

60 Mass % of non-stretched polyester fibers (TEPYRUS TK08PN manufactured by Teijin Ltd.) having a fineness of 0.2 dtex and a length of 3 mm were mixed with 40 mass % of polyester binder fibers (sheath component: low melting point PET, fusing temperature: 110° C.; core component: PET; MELTY 4080 manufactured by Unitika Ltd.) having a fineness of 1.5 dtex and a length of 5 mm, to which an acrylamide-type dispersing agent (ACRYPERSE P-NS manufactured by Diafloc Co., Ltd.) was added in an amount of 0.3% to obtain a stock for forming first and third layers. A Manila hemp pulp was beaten to Canadian Standard freeness (CSF) 700 to obtain a stock for a second layer.

Using a paper machine having a first cylinder wire section, a short wire section and a second cylinder wire section, a 3-layer paper of polyester fiber layer-Manila hemp fiber layer-polyester fiber layer according to the present invention was manufactured by unification by paper making. Thus, the polyester fiber layer stock was fed to the first cylinder wire section in an amount providing a target basis weight of 2 g/m² and to the second cylinder wire section in an amount providing a target basis weight of 5.0 g/m² while the Manila hemp fiber layer stock was fed to the short wire section in an amount providing a target basis weight of 6.5 g/m².

The peel strength of the 3-layer paper was found to be 1.97 N/m between the third, polyester fiber layer and the second, hemp fiber layer. These layers were delaminated uniformly at the interface therebetween. Fuzz of the surface and liberation of fibers from the layers of the thus obtained tissue sheets were found to be much less noticeable as compared with those obtained by hand paper machine. When measured with Stiffness Tester manufactured by L & W Inc. in the machine direction (MD) with a sample width of 38 mm, a bending length of 1 mm and a bending angle of 25°, a tissue sheet of the third, polyester fiber layer and a tissue sheet of the remaining composite sheet composed of the first, polyester fiber layer and the Manila hemp fiber layer had flexural rigidity of 5.5 mN and 26 mN, respectively. A heat-sensitive stencil printing master was prepared using the 2-layer tissue sheet as a porous support in such a manner that a thermoplastic resin film was applied to the polyester fiber layer. The porous support had good ink permeability and stiffness. The 3-layer paper and two tissue sheets obtained therefrom had properties summarized in Table 2.

Preparation of Heat-Sensitive Stencil Printing Master:

A 5 mass % toluene solution of a polyester resin (ELEETEL manufactured by Unitika Ltd.) was applied with a gravure coater in an amount of 0.5 g/m² (on dry basis) on one surface of a biaxially oriented polyester film having a thickness of 2.0 μm. On the non-dried coating on the polyester film, the 3-layer sheet prepared above was superimposed such that the outer surface of the first layer was contacted with the polyester coating to obtain a laminate sheet. The laminate sheet was peeled at the interface between the second layer and the third layer to obtain a polyester film-tissue paper laminate. A 1.0 mass % toluene solution of a silicone oil (SF8422 manufactured by Shinetsu Kagaku Co., Ltd.) was applied using a smooth bar to the other surface of the polyester film and dried to form a melt-adhesion preventing layer thereon, thereby obtaining a heat-sensitive stencil printing master. The thus obtained stencil printing master was perforated and printing was performed with a printer (Priport VT2820 manufactured by Ricoh Company, Ltd.). Good results were obtained.

Example 8

60 Mass % of non-stretched polyester fibers (TEPYRUS TK08PN manufactured by Teijin Ltd.) having a fineness of 0.2 dtex and a length of 3 mm were mixed with 40 parts by weight of polyester binder fibers (sheath component: low melting point PET, fusing temperature: 110° C.; core component: PET; SOFIT N720 manufactured by Kuraray Co., Ltd.) having a fineness of 1.7 dtex and a length of 5 mm, to which an acrylamide-type dispersing agent (ACRYPERSE P-NS manufactured by Diafloc Co., Ltd.) was added in an amount of 0.3% to obtain a stock for a polyester fiber layer. A Manila hemp pulp was beaten to Canadian Standard freeness (CSF) 716 and mixed with 0.75 mass % (based on the fibers) of a polyethylene wax (PERTOL N856 manufactured by Kindai Chemical Industry Co., Ltd.) to obtain a stock for a Manila hemp fiber layer.

Using a paper machine having a cylinder wire section and a short wire section, a 2-layer paper according to the present invention was manufactured. Thus, the polyester fiber layer stock was fed to the short wire section in an amount providing a target basis weight of 5 g/m$^2$, while the Manila hemp fiber layer stock was fed to the cylinder wire section in an amount providing a target basis weight of 7.5 g/m$^2$ for unification of the two layers by paper making. In this case, the wet Manila hemp fiber layer was smoothed with a mesh wire roll prior to the unification. The peel strength of the 2-layer paper at the interface was found to be 1.7 N/m. The sheet was able to be easily and uniformly separated into a tissue sheet of the polyester fibers and a tissue sheet of the Manila hemp fibers. The 2-layer paper and the two tissue sheets had the properties summarized in Table 2. The tissue sheet of the polyester fiber was found to be suitable for use as a porous support for a heat-sensitive stencil printing master.

Example 9

40 Mass % of non-stretched polyester fibers (TEPYRUS TK08PN manufactured by Teijin Ltd.) having a fineness of 0.2 dtex and a length of 3 mm were mixed with 20 mass % of non-stretched polyester fibers (EP101 manufactured by Kuraray Co., Ltd.) having a fineness of 1.1 dtex and a length of 3 mm and with 40 mass % of polyester binder fibers (sheath component: low melting point PET, fusion temperature: 110° C.; core component: PET; MELTY 4080 manufactured by Unitika Ltd.) having a fineness of 1.1 dtex and a length of 3 mm, to which an acrylamide-type dispersing agent (ACRYPERSE P-NS manufactured by Diafloc Co., Ltd.) was added in an amount of 0.3% based on the weight of the fibers to obtain a stock for a polyester fiber layer. A Manila hemp pulp was beaten to Canadian Standard freeness (CSF) 594 and mixed with 0.75 mass % (based on the fibers) of a polyethylene wax (PERTOL N856 manufactured by Kindai Chemical Industry Co., Ltd.) as a releasing agent to obtain a stock for a Manila hemp fiber layer.

Using a paper machine having a first cylinder wire section, a short wire section and a second cylinder wire section, a 3-layer paper according to the present invention was manufactured by unification by paper making. Thus, the polyester fiber layer stock was fed to the first and second cylinder wire sections each in an amount providing a target basis weight of 5 g/m$^2$, while the Manila hemp fiber layer stock was fed to the short wire section in an amount providing a target basis weight of 8 g/m$^2$. The polyester fiber wet layer picked up on a felt from the first cylinder section was smoothed with a mesh wire roll before unification by paper making. The peel strength of the 3-layer paper was 2.1 N/m at the interface between the layer produced in the first cylinder wire section and the layer produced in the short wire section and 2.3 N/m at the interface between the layer produced in the short wire section and the layer produced in the second cylinder wire section. The 3-layer paper could be uniformly delaminated. The 3-layer paper was subjected to delamination using a device as shown in FIG. 1 to form two rolls of polyester fiber tissue sheets and one roll of the hemp fiber tissue sheet. The 3-layer paper and the three tissue sheets had the properties summarized in Table 2. Each of these tissue sheets was found to be suitable for use as a porous support for a heat-sensitive stencil printing master.

Preparation of Heat-Sensitive Stencil Printing Masters:

A 5 mass % toluene solution of a polyester resin (ELEETEL manufactured by Unitika Ltd.) was applied in an amount of 0.5 g/m$^2$ (on dry basis) with a gravure coater on one surface of a biaxially oriented polyester film having a thickness of 2.0 μm. Each of the rolled tissue sheets obtained above was superimposed on the non-dried coating on the polyester film and the assembly was then dried with a dryer to obtain polyester-tissue sheet laminates. A 1.0 mass % toluene solution of a silicone oil (SF8422 manufactured by Shinetsu Kagaku Co., Ltd.) was applied using a smooth bar to the other surface of the polyester film and dried to form a melt-adhesion preventing layer thereon, thereby obtaining three kinds of heat-sensitive stencil printing masters. The thus obtained stencil printing masters were perforated and printing was performed with a printer (Priport VT2820 manufactured by Ricoh Company, Ltd.). The polyester fiber tissue sheets were found to be usable as a high grade printing porous support which did not form white spots. The hemp fiber tissue sheet was usable as porous support for low grade images which gave suitable prints though white spots were produced.

Example 10

30 Mass % of stretched polyester fibers (EP043 manufactured by Kuraray Co., Ltd.) having a fineness of 0.5 dtex and a length of 5 mm were mixed with 10 mass % of non-stretched polyester fibers (EP101 manufactured by Kuraray Co., Ltd.) having a fineness of 1.1 dtex and a length of 3 mm, 30 mass % of polyester binder fibers (sheath component: low melting point PET, fusion temperature: 110° C.; core component: PET; MELTY 4080 manufactured by Unitika Ltd.) having a fineness of 1.1 dtex and a length of 3 mm and 30 parts by weight of polyester binder fibers (sheath component: low melting point PET, fusion temperature: 110° C.; core component: PET; MELTY 4080 manufactured by Unitika Ltd.) having a fineness of 1.7 dtex and a length of 5 mm, to which an acrylamide-type dispersing agent (ACRYPERSE P-NS manufactured by Diafloc Co., Ltd.) was added in an amount of 0.3% based on the weight of the fibers to obtain a stock for a polyester fiber layer. A breached softwood kraft pulp (NBKP) was beaten to Canadian Standard freeness (CSF) 515 to obtain a stock for a wood pulp fiber layer.

Using a paper machine having a first cylinder wire section, a short wire section and a second cylinder wire section, a 3-layer paper according to the present invention was manufactured by unification by paper making. Thus, the polyester fiber layer stock was fed to the first and second cylinder wire sections each in an amount providing a target basis weight of 5 g/m$^2$, while the wood pulp fiber layer stock was fed to the short wire section in an amount providing a target basis weight of 10 g/m$^2$ in the same manner as that in Example 8 for unification by paper making. The peel strength of the 3-layer paper was 3.6 N/m at the interface between the layer produced in the first cylinder wire section and the layer produced in the short wire section and 3.8 N/m at the interface between the layer produced in the short wire section and the layer produced in the second cylinder wire section. The 3-layer paper could be uniformly delaminated. The delamination gave two rolls of polyester fiber tissue sheets and one roll of the wood pulp fiber tissue sheet. The 3-layer paper and the three tissue sheets had the properties summarized in Table 2.

Example 11

Example 9 was repeated in the same manner as described except that 0.75 mass % (based on the fibers) of a polyethylene wax (PERTOL N856 manufactured by Kindai Chemical Industry Co., Ltd.) as a releasing agent was incorporated into the stock for wood pulp fiber layer to obtain a 3-layer paper of the present invention. The peel strength of the 3-layer paper was 2.7 N/m at the interface between the layer produced in the first cylinder wire section and the layer produced in the short wire section and 2.8 N/m at the interface between the layer produced in the short wire section and the layer produced in the second cylinder wire section. The 3-layer paper could be uniformly delaminated with less peel resistance as compared with that in Example 9. The 3-layer paper and the tissue sheets had the properties summarized in Table 2.

TABLE 2

| Example | | | 7 | 8 | 9 | 10 | 11 |
|---|---|---|---|---|---|---|---|
| Synthetic fiber layer | PET binder fiber | 1.7 dtex × 5 mm | 40% | — | — | 30% | 30% |
| | | 1.1 dtex × 3 mm | — | — | 40% | 30% | 30% |
| | Non-stretched PET fiber | 0.2 dtex × 3 mm | 60% | — | 40% | — | — |
| | | 1.1 dtex × 3 mm | — | — | 20% | 10% | 10% |
| | Stretched PET fiber 0.4 dtex × 5 mm | | — | — | — | 30% | 30% |
| | Amount of dispersing agent | | 0.3% | — | 0.3% | 0.3% | 0.3% |
| | Basis weight (g/m$^2$) | | 2.0 | — | 5.0 | 5.0 | 5.0 |
| | Kind of wire | | *1 | — | *1 | *1 | *1 |
| Cellulose fiber layer | Manila hemp pulp CSF | | 711 | 716 | 594 | — | — |
| | | | 100% | 100% | 100% | — | — |
| | NBKP CSF | | — | — | — | 515 | 515 |
| | | | — | — | — | 100% | 100% |
| | Amount of releasing agent | | — | 0.75% | 0.75% | — | 0.75% |
| | Basis weight (g/m$^2$) | | 6.5 | 7.5 | 8.0 | 10.0 | 10.0 |
| | Kind of wire | | *3 | *1 | *3 | *3 | *3 |
| Synthetic fiber layer | PET binder fiber | 1.7 dtex × 5 mm | 40% | 40% | — | 30% | 30% |
| | | 1.1 dtex × 3 mm | — | — | 40% | 30% | 30% |
| | Non-stretched PET fiber | 0.2 dtex × 3 mm | 60% | 60% | 40% | — | — |
| | | 1.1 dtex × 3 mm | — | — | 20% | 10% | 10% |
| | Stretched PET fiber 0.4 dtex × 5 mm | | — | — | — | 30% | 30% |
| | Amount of dispersing agent | | 0.3% | 0.3% | 0.3% | 0.3% | 0.3% |
| | Basis weight (g/m$^2$) | | 5.0 | 5.0 | 5.0 | 5.0 | 5.0 |
| | Kind of wire | | *2 | *3 | *2 | *2 | *2 |
| Drying Temperature | °C. | | 98 | 104 | 98 | 95 | 95 |

| Example | 7 | 8 | 9 | 10 | 11 |
|---|---|---|---|---|---|
| Multi-layer Paper | | | | | |
| Basis weight (g/m$^2$) | 13.48 | 13.51 | 18.00 | 23.75 | 23.67 |
| Density (g/cm$^3$) | 0.331 | 0.313 | 0.339 | 0.324 | 0.319 |
| T. strg.   MD (kN/m) | 0.330 | 0.360 | 1.012 | 0.712 | 0.644 |
|            CD (kN/m) | 0.065 | 0.057 | 0.214 | 0.165 | 0.151 |
| Synthetic fiber tissue sheet | | | | | |
| Basis weight (g/m$^2$) | | — | 4.99 | 5.94 | 5.88 |
| Density (g/cm$^3$) | | — | 0.200 | 0.198 | 0.196 |
| T. strg.   MD (kN/m) | | — | 0.152 | 0.112 | 0.109 |
|            CD (kN/m) | | — | 0.016 | 0.011 | 0.010 |
| Peel strength (N/m) | | — | 2.3 | 3.6 | 2.7 |
| Cellulose fiber tissue sheet | | | | | |
| Basis weight (g/m$^2$) | 8.68 | 8.57 | 8.20 | 12.5 | 12.6 |
| Density (g/cm$^3$) | 0.294 | 0.283 | 0.328 | 0.383 | 0.387 |
| T. strg.   MD (kN/m) | 0.162 | 0.200 | 0.745 | 0.51 | 0.442 |
|            CD (kN/m) | 0.061 | 0.027 | 0.221 | 0.154 | 0.136 |
| Peel strength (N/m) | 2.0 | 1.7 | 2.1 | 3.8 | 2.8 |
| Synthetic fiber tissue sheet | | | | | |
| Basis weight (g/m$^2$) | 4.80 | 4.94 | 4.81 | 5.31 | 5.19 |
| Density (g/cm$^3$) | 0.212 | 0.190 | 0.198 | 0.195 | 0.193 |
| T. strg.   MD (kN/m) | 0.184 | 0.141 | 0.139 | 0.107 | 0.100 |
|            CD (kN/m) | 0.015 | 0.039 | 0.014 | 0.010 | 0.011 |

*1: first cylinder wire
*2: second cylinder wire
*3: short wire

Example 12

A slurry containing 90 mass % of stretched polyester fibers (TM04PN manufactured by Teijin Ltd.) having a fineness of 0.1 dtex and a length of 3 mm were mixed with 10 mass % of non-stretched polyester fibers (TK08PN manufactured by Teijin Ltd.) having a fineness of 0.2 dtex and a length of 3 mm was prepared as a stock for forming an intermediate layer. As a stock for forming first and third layers to be disposed adjacent to the intermediate layer, also prepared was a slurry containing 40 mass % of polyester binder fibers (sheath component: low melting point PET, fusing temperature: 110° C.; core component: PET; MELTY 4080 manufactured by Unitika Ltd.) having a fineness of 1.7 dtex and a length of 5 mm and 60 mass % of non-stretched polyester fibers (TK08PN manufactured by Teijin Ltd.) having a fineness of 0.2 dtex and a length of 3 mm, to which an acrylamide-type dispersing agent (ACRYPERSE P-NS manufactured by Diafloc Co., Ltd.) was added in an amount of 0.3% based on the weight of the fibers.

Using a TAPPI standard sheet machine, a polyester fiber layer having a basis weight of 6 g/m$^2$ was formed as the first layer, a polyester fiber intermediate layer having a basis weight of 2 g/m$^2$ was formed as the second layer, and a polyester fiber layer having a basis weight of 6 g/m$^2$ was formed as the third layer. These layers were unified by paper making such that the wet second layer was superimposed on the surface of the wet first layer picked up on a filter paper, on which the wet third layer was superimposed by picking up. The resulting combined sheet was pressed for dewatering and dried on a cylindrical drier for experimental use at 110° C. to obtain a 3-layer paper having three, first, intermediate and third polyester fiber layers and having an intralayer peel strength of not greater than 10 N/m in the intermediate layer. The peel resistance of the intermediate layer of the 3-layer paper was found to be 10 N/m. The intralayer delamination occurred uniformly in the intermediate layer along a plane nearly bisecting the intermediate layer. The 3-layer paper and the tissue sheets (tissue paper) after delaminating had the properties summarized in Table 3.

Preparation of Heat-Sensitive Stencil Printing Masters:

A 5 mass % toluene solution of a polyester resin (ELEETEL 3500 manufactured by Unitika Ltd.) was applied in an amount of 0.5 g/m$^2$ (on dry basis) on one surface of each of two, biaxially oriented polyester films having a thickness of 2.0 μm. The peeled surface of each of the tissue sheets obtained above was slightly pressed with a hot surface to suppress the fuzz and then bonded to the non-dried coating on respective polyester films. Each assembly was then dried with a dryer to obtain laminates of the polyester film and the tissue sheet. A 1.0 mass % toluene solution of a silicone oil (SF8422 manufactured by Shinetsu Kagaku Co., Ltd.) was applied using a smooth bar to the other surface of each of the polyester films and dried to form a melt-adhesion preventing layer thereon, thereby obtaining two sheets of heat-sensitive stencil printing masters.

Each of the heat-sensitive stencil printing masters was perforated and printing was performed with a printer (Priport VT2820 manufactured by Ricoh Company, Ltd.). Good results were obtained. The tissue sheets were found to be usable as porous supports for high grade images without white spots.

Example 13

Example 12 was repeated in the same manner as described except that the basis weight of the intermediate polyester fiber layers was increased to 6 g/m$^2$ to obtain a 3-layer paper having an intralayer peel strength of not greater than 10 N/m. The peel resistance of the intermediate layer of the 3-layer paper was found to be 0.6 N/m. The intralayer delamination occurred uniformly in the intermediate layer along a plane nearly bisecting the intermediate layer. The 3-layer paper and the tissue sheets after delamination had the properties summarized in Table 3.

Preparation of Heat-Sensitive Stencil:

Two sheets of heat-sensitive stencil printing masters were prepared in the same manner as that in Example 12. Each of the heat-sensitive stencil printing masters was perforated and printing was performed with a printer (Priport VT2820 manufactured by Ricoh Company, Ltd.). The tissue sheets were found to be usable as porous supports for high grade images without white spots.

Example 14

Preparation of 3-Layer Paper:

A Manila hemp pulp sheet was cut with a razor into small squares of about 1 mm side length and disintegrated to obtain a slurry (average fiber length: 1.3 mm). Example 12 was repeated in the same manner as described using this slurry as a stock for the intermediate layer to obtain a 3-layer paper having the intermediate layer with an intralayer peel strength of not greater than 10 N/m. The peel resistance of the intermediate layer of the 3-layer paper was found to be 9.8 N/m. The intralayer delamination occurred uniformly in the intermediate layer along a plane nearly bisecting the intermediate layer.

Preparation of Heat-Sensitive Stencil Printing Masters:

A 5 mass % toluene solution of a polyester resin (ELEETEL 3500 manufactured by Unitika Ltd.) was applied in an amount of 0.5 g/m$^2$ (on dry basis) on one surface of each of two, biaxially oriented polyester-films having a thickness of 2.0 μm. The peeled surface of each of the tissue sheets obtained above was slightly pressed with a hot surface to suppress the fuzz and then bonded to the non-dried coating on respective polyester films. Each assembly was then dried with a dryer to obtain laminates of the polyester film and the tissue sheet. A 1.0 mass % toluene solution of a silicone oil (SF8422 manufactured by Shinetsu Kagaku Co., Ltd.) was applied using a smooth bar to the other surface of each of the polyester films and dried to form a melt-adhesion preventing layer thereon, thereby obtaining two sheets of heat-sensitive printing masters.

Each of the heat-sensitive stencil printing masters was perforated and printing was performed with a printer (Priport VT2820 manufactured by Ricoh Company, Ltd.). Good results were obtained. The tissue sheets were found to be suited as a porous support for so-called low grade images which was usable as prints though white spots existed.

TABLE 3

| Example | | | 12 | 13 |
|---|---|---|---|---|
| Constitution | Material for 1st layer | PET binder fiber 1.7 dtex × 5 mm | 40% | 40% |
| | | Non-stretched PET fiber 0.2 dtex × 3 mm | 60% | 60% |
| | | Basis weight (g/m$^2$) | 6.0 | 6.0 |
| | Material for 2nd layer | Non-stretched PET fiber 0.2 dtex × 3 mm | 10% | 10% |
| | | Stretched PET fiber 0.1 dtex × 3 mm | 90% | 90% |
| | | Manila hemp pulp | — | — |
| | | Basis weight (g/m$^2$) | 2.0 | 6.0 |
| | Material for 3rd | PET binder fiber 1.7 dtex × 5 mm | 40% | 40% |

TABLE 3-continued

|  | layer | Non-stretched PET fiber 0.2 dtex × 3 mm | 60% | 60% |
|---|---|---|---|---|
|  |  | Basis weight (g/m²) | 6.0 | 6.0 |
| Drying temperature (° C.) |  |  | 110 | 110 |
| Characteristics 1 | Composite Paper | Basis weight (g/m²) | 14.02 | 17.98 |
|  |  | Density (g/cm³) | 0.314 | 0.322 |
|  |  | Tensile strength (kN/m) | 0.50 | 0.52 |
| Characteristics 2 | 1st sheet after delamination | Basis weight (g/m²) | 7.05 | 8.96 |
|  |  | Density (g/cm³) | 0.257 | 0.298 |
|  |  | Tensile strength (kN/m) | 0.20 | 0.27 |
|  |  | Peel strength (N/m) | 10.0 | 0.6 |
|  | 2nd sheet after delamination | Basis weight (g/m²) | 6.97 | 9.02 |
|  |  | Density (g/cm³) | 0.260 | 0.302 |
|  |  | Tensile strength (kN/m) | 0.18 | 0.23 |

According to the present invention, reduction of basis weight of tissue papers and heat-sensitive stencil printing masters can be realized, whilst there has been a limit in such a reduction with the conventional methods. According to the present invention, it is possible to produce heat-sensitive stencil printing masters having excellent ink permeability at reduced costs. Further, according to the present invention, since a multi-layer paper having easy peelability gives two or more tissue sheets, the productivity of tissue sheets is significantly improved. The tissue sheets according to the present invention can be used as heat-sensitive stencil printing masters, filters and electric insulators.

What is claimed is:

1. A multi-layer paper comprising at least two paper layers combined by a paper making method, characterized in that said multi-layer paper has at least one peelable paper layer interface having a peel strength of 10 N/m or less, and in that said multi-layer paper is peelable into at least two tissue sheets at said peelable paper layer interface.

2. A multi-layer paper as claimed in claim 1, wherein one of the two adjacent paper-layers between which said peelable paper layer interface is defined is mainly made of cellulose fibers, while the other paper layer is mainly made of synthetic fibers including binder fibers, said binder fibers exhibiting binder effect at a temperature of 90–120° C.

3. A multi-layer paper as claimed in claim 2, wherein said synthetic fibers are heteroatom-containing synthetic fibers.

4. A multi-layer paper as claimed in claim 2, wherein said synthetic fibers are polyolefin fibers.

5. A multi-layer paper as claimed in claim 2, wherein said binder fibers are composite fibers and are contained in an amount of 20–100 mass %.

6. A multi-layer paper as claimed in claim 2, wherein said binder fibers are single-component fibers and are contained in an amount of 20–70 mass %.

7. A multi-layer paper as claimed in claim 5, wherein said binder fibers are composite fibers having a core-sheath structure, said sheath being comprised of a resin exhibiting a binder effect at a temperature of 90–120° C.

8. A multi-layer paper as claimed in claim 7, wherein the resin constituting said sheath is a polyester resin.

9. A multi-layer paper as claimed in claim 7, wherein the resin constituting said sheath is a polyolefin resin or an ethylene-vinyl acetate copolymer resin.

10. A multi-layer paper as claimed in claim 1, wherein one of the two adjacent paper layers between which said peelable paper layer interface is defined is made of synthetic fibers including composite binder fibers having a low melting point component made of a polyolefin resin or an ethylene-vinyl acetate copolymer resin, while the other paper layer is made of synthetic fibers including composite binder fibers having a low melting point component made of a polyester resin, both of said binder fibers exhibiting binder effect at a temperature of 90–120° C.

11. A multi-layer paper as claimed in claim 10, wherein said one paper layer made of synthetic fibers including composite binder fibers having a low melting point component made of a polyolefin resin or an ethylene-vinyl acetate copolymer resin is mainly made of polyolefin fibers, and wherein said binder fibers of said one paper layer exhibits binder effect at a temperature of 90–120° C. and is contained in an amount of 20–100 mass %.

12. A multi-layer paper as claimed in claim 10, wherein said the other paper layer made of synthetic fibers including composite binder fibers having a low melting point component made of a polyester resin is mainly made of heteroatom-containing synthetic fibers, and wherein said binder fibers exhibit binder effect at a temperature of 90–120° C. and is contained in an amount of 20–100 mass %.

13. A multi-layer paper as claimed in claim 2, wherein said one layer mainly made of cellulose fibers contains a release agent.

14. A multi-layer paper as claimed in claim 2, wherein said the other layer mainly made of synthetic fibers are made of polyester fibers.

15. A multi-layer paper as claimed in claim 1, wherein one of the two adjacent paper layers between which said peelable interface is defined is made of relatively more highly oriented fibers as compared with that of the other paper layer.

16. A multi-layer paper as claimed in claim 1, wherein at least one of the two surfaces of two adjacent paper layers which surfaces define said peelable interface has been subjected to a smoothing treatment.

17. A multi-layer paper as claimed in claim 1, wherein at least one of said tissue sheet peeled from said multi-layer paper has a basis weight of 1–20 g/m².

18. A multi-layer paper as claimed in claim 2, wherein the tissue sheet peeled from said multi-layer paper and made of the synthetic fibers has a density of not greater than 0.35 g/cm³.

19. A multi-layer paper as claimed in claim 3, wherein the tissue sheet peeled from said multi-layer paper and made of the heteroatom-containing synthetic fibers has a density of not greater than 0.35 g/cm³.

20. A multi-layer paper comprising at least three paper layers unified by a paper making method, characterized in that said multi-layer paper has, as an intermediate layer, at least one paper layer which can cause intralayer delamination and which has a peel strength of 10 N/m or less, and in that said multi-layer paper is peelable into at least two tissue sheets at said intermediate paper layer.

21. A multi-layer paper as claimed in claim 20, wherein each of the paper layers adjacent to said intermediate layer is mainly made of synthetic fibers including at least binder fibers, said binder fibers exhibiting binder effect at a temperature of 90–120° C.

22. A multi-layer paper as claimed in claim 21, wherein said binder fibers are composite fibers and are contained in an amount of 20–100 mass %.

23. A multi-layer paper as claimed in claim 21, wherein said binder fibers are single-component fibers and are contained in an amount of 20–70 mass %.

24. A multi-layer paper as claimed in claim 22, wherein said binder fibers are composite fibers having a core-sheath structure, said sheath being comprised of a resin exhibiting a binder effect at a temperature of 90–120° C.

25. A multi-layer paper as claimed in claim 20, wherein said paper layer which can cause intralayer delamination is mainly made of polyester fibers.

26. A multi-layer paper as claimed in claim 25, wherein said paper layer made of said polyester fibers has a basis weight of 2–8 g/m².

27. A multi-layer paper as claimed in claim 20, wherein said paper layer which can cause intralayer delamination is mainly made of cellulose fibers.

28. A multi-layer paper as claimed in claim 25, wherein said paper layer made of said cellulose fibers has a basis weight of 5–10 g/m².

29. A method of forming tissue sheets, comprising providing a multi-layer paper according to claim 1, and delaminating said multi-layer paper at said peelable paper layer interface to obtain at least two tissue sheets.

30. A method as claimed in claim 29, wherein at least one of said tissue sheets has a basis weight of 2–20 g/m².

31. A method of forming tissue sheets, comprising providing a multi-layer paper according to claim 20, and delaminating said multi-layer paper at said paper layer which can cause intralayer delamination to obtain at least two tissue sheets.

32. A method as claimed in claim 31, wherein at least one of said tissue sheets has a basis weight of 2–20 g/m².

33. A tissue sheet obtained by a method according to claim 29 and having a basis weight of 2–20 g/m².

34. A reinforced tissue sheet material, comprising a tissue sheet according to claim 33 and a reinforcing member bonded thereto.

35. A reinforced tissue sheet material according to claim 34, wherein said reinforcing member is a polymer film or a metal foil.

36. A reinforced multi-layer paper material, comprising a multi-layer paper according to claim 1 and a reinforcing member bonded to at least one of the both sides of said multi-layer paper.

37. A reinforced multi-layer paper material according to claim 36, wherein said reinforcing member is a polymer film or a metal foil.

38. A method of preparing a reinforced tissue sheet material, comprising providing a reinforced multi-layer paper material according to claim 36, and delaminating said multi-layer paper to obtain a reinforced tissue sheet material having said reinforcing member bonded thereto.

39. A porous support material for producing a heat-sensitive stencil printing master, comprising a multi-layer paper according to claim 1.

40. A material for producing a heat-sensitive stencil printing master, comprising a laminate obtained by bonding a thermoplastic polymer film to at least one side of a multi-layer paper according to claim 1.

41. A heat-sensitive stencil printing master comprising a porous support, and a thermoplastic polymer film bonded to said porous support, wherein said porous support is a tissue paper according to claim 33.

42. A method of preparing a heat-sensitive stencil printing master, comprising a step of separating a tissue sheet from a material according to claim 39, and a step of bonding a thermoplastic polymer film to the peeled surface of said separated thin sheet.

43. A method of preparing a heat-sensitive stencil printing master, comprising separating, from said material according to claim 40, a laminate having the thin sheet to which said thermoplastic polymer film has been bonded.

44. A multi-layer paper as claimed in claim 3, wherein said binder fibers are composite fibers and are contained in an amount of 20–100 mass %.

45. A multi-layer paper as claimed in claim 4, wherein said binder fibers are composite fibers and are contained in an amount of 20–100 mass %.

46. A multi-layer paper as claimed in claim 3, wherein said binder fibers are single-component fibers and are contained in an amount of 20–70 mass %.

47. A multi-layer paper as claimed in claim 4, wherein said binder fibers are single-component fibers and are contained in an amount of 20–70 mass %.

48. A multi-layer paper as claimed in claim 3, wherein said one layer mainly made of cellulose fibers contains a release agent.

49. A multi-layer paper as claimed in claim 4, wherein said one layer mainly made of cellulose fibers contains a release agent.

50. A multi-layer paper as claimed in claim 5, wherein said one layer mainly made of cellulose fibers contains a release agent.

51. A multi-layer paper as claimed in claim 6, wherein said one layer mainly made of cellulose fibers contains a release agent.

52. A multi-layer paper as claimed in claim 7, wherein said one layer mainly made of cellulose fibers contains a release agent.

53. A multi-layer paper as claimed in claim 8, wherein said one layer mainly made of cellulose fibers contains a release agent.

54. A multi-layer paper as claimed in claim 3, wherein said the other layer mainly made of synthetic fibers are made of polyester fibers.

55. A multi-layer paper as claimed in claim 4, wherein said the other layer mainly made of synthetic fibers are made of polyester fibers.

56. A multi-layer paper as claimed in claim 5, wherein said the other layer mainly made of synthetic fibers are made of polyester fibers.

57. A multi-layer paper as claimed in claim 6, wherein said the other layer mainly made of synthetic fibers are made of polyester fibers.

58. A multi-layer paper as claimed in claim 7, wherein said the other layer mainly made of synthetic fibers are made of polyester fibers.

59. A multi-layer paper as claimed in claim 8, wherein said the other layer mainly made of synthetic fibers are made of polyester fibers.

60. A multi-layer paper as claimed in claim 2, wherein one of the two adjacent paper layers between which said peelable interface is defined is made of relatively more highly oriented fibers as compared with that of the other paper layer.

61. A multi-layer paper as claimed in claim 3, wherein one of the two adjacent paper layers between which said peelable interface is defined is made of relatively more highly oriented fibers as compared with that of the other paper layer.

62. A multi-layer paper as claimed in claim 4, wherein one of the two adjacent paper layers between which said peelable interface is defined is made of relatively more highly oriented fibers as compared with that of the other paper layer.

63. A multi-layer paper as claimed in claim 5, wherein one of the two adjacent paper layers between which said peelable interface is defined is made of relatively more highly oriented fibers as compared with that of the other paper layer.

64. A multi-layer paper as claimed in claim 6, wherein one of the two adjacent paper layers between which said peelable interface is defined is made of relatively more highly oriented fibers as compared with that of the other paper layer.

65. A multi-layer paper as claimed in claim 7, wherein one of the two adjacent paper layers between which said peelable interface is defined is made of relatively more highly oriented fibers as compared with that of the other paper layer.

66. A multi-layer paper as claimed in claim 8, wherein one of the two adjacent paper layers between which said peelable interface is defined is made of relatively more highly oriented fibers as compared with that of the other paper layer.

67. A multi-layer paper as claimed in claim 9, wherein one of the two adjacent paper layers between which said peelable interface is defined is made of relatively more highly oriented fibers as compared with that of the other paper layer.

68. A multi-layer paper as claimed in claim 10, wherein one of the two adjacent paper layers between which said peelable interface is defined is made of relatively more highly oriented fibers as compared with that of the other paper layer.

69. A multi-layer paper as claimed in claim 11, wherein one of the two adjacent paper layers between which said peelable interface is defined is made of relatively more highly oriented fibers as compared with that of the other paper layer.

70. A multi-layer paper as claimed in claim 12, wherein one of the two adjacent paper layers between which said peelable interface is defined is made of relatively more highly oriented fibers as compared with that of the other paper layer.

71. A multi-layer paper as claimed in claim 13, wherein one of the two adjacent paper layers between which said peelable interface is defined is made of relatively more highly oriented fibers as compared with that of the other paper layer.

72. A multi-layer paper as claimed in claim 14, wherein one of the two adjacent paper layers between which said peelable interface is defined is made of relatively more highly oriented fibers as compared with that of the other paper layer.

73. A multi-layer paper as claimed in claim 2, wherein at least one of the two surfaces of two adjacent paper layers which surfaces define said peelable interface has been subjected to a smoothing treatment.

74. A multi-layer paper as claimed in claim 3, wherein at least one of the two surfaces of two adjacent paper layers which surfaces define said peelable interface has been subjected to a smoothing treatment.

75. A multi-layer paper as claimed in claim 4, wherein at least one of the two surfaces of two adjacent paper layers which surfaces define said peelable interface has been subjected to a smoothing treatment.

76. A multi-layer paper as claimed in claim 5, wherein at least one of the two surfaces of two adjacent paper layers which surfaces define said peelable interface has been subjected to a smoothing treatment.

77. A multi-layer paper as claimed in claim 6, wherein at least one of the two surfaces of two adjacent paper layers which surfaces define said peelable interface has been subjected to a smoothing treatment.

78. A multi-layer paper as claimed in claim 7, wherein at least one of the two surfaces of two adjacent paper layers which surfaces define said peelable interface has been subjected to a smoothing treatment.

79. A multi-layer paper as claimed in claim 8, wherein at least one of the two surfaces of two adjacent paper layers which surfaces define said peelable interface has been subjected to a smoothing treatment.

80. A multi-layer paper as claimed in claim 9, wherein at least one of the two surfaces of two adjacent paper layers which surfaces define said peelable interface has been subjected to a smoothing treatment.

81. A multi-layer paper as claimed in claim 10, wherein at least one of the two surfaces of two adjacent paper layers which surfaces define said peelable interface has been subjected to a smoothing treatment.

82. A multi-layer paper as claimed in claim 11, wherein at least one of the two surfaces of two adjacent paper layers which surfaces define said peelable interface has been subjected to a smoothing treatment.

83. A multi-layer paper as claimed in claim 12, wherein at least one of the two surfaces of two adjacent paper layers which surfaces define said peelable interface has been subjected to a smoothing treatment.

84. A multi-layer paper as claimed in claim 13, wherein at least one of the two surfaces of two adjacent paper layers which surfaces define said peelable interface has been subjected to a smoothing treatment.

85. A multi-layer paper as claimed in claim 14, wherein at least one of the two surfaces of two adjacent paper layers which surfaces define said peelable interface has been subjected to a smoothing treatment.

86. A multi-layer paper as claimed in claim 15, wherein at least one of the two surfaces of two adjacent paper layers which surfaces define said peelable interface has been subjected to a smoothing treatment.

87. A multi-layer paper as claimed in claim 2, wherein at least one of said tissue sheet peeled from said multi-layer paper has a basis weight of 1–20 $g/m^2$.

88. A multi-layer paper as claimed in claim 3, wherein at least one of said tissue sheet peeled from said multi-layer paper has a basis weight of 1–20 $g/m^2$.

89. A multi-layer paper as claimed in claim 4, wherein at least one of said tissue sheet peeled from said multi-layer paper has a basis weight of 1–20 $g/m^2$.

90. A multi-layer paper as claimed in claim 5, wherein at least one of said tissue sheet peeled from said multi-layer paper has a basis weight of 1–20 $g/m^2$.

91. A multi-layer paper as claimed in claim 6, wherein at least one of said tissue sheet peeled from said multi-layer paper has a basis weight of 1–20 $g/m^2$.

92. A multi-layer paper as claimed in claim 7, wherein at least one of said tissue sheet peeled from said multi-layer paper has a basis weight of 1–20 $g/m^2$.

93. A multi-layer paper as claimed in claim 8, wherein at least one of said tissue sheet peeled from said multi-layer paper has a basis weight of 1–20 $g/m^2$.

94. A multi-layer paper as claimed in claim 9, wherein at least one of said tissue sheet peeled from said multi-layer paper has a basis weight of 1–20 $g/m^2$.

95. A multi-layer paper as claimed in claim 10, wherein at least one of said tissue sheet peeled from said multi-layer paper has a basis weight of 1–20 $g/m^2$.

96. A multi-layer paper as claimed in claim 11, wherein at least one of said tissue sheet peeled from said multi-layer paper has a basis weight of 1–20 $g/m^2$.

97. A multi-layer paper as claimed in claim 12, wherein at least one of said tissue sheet peeled from said multi-layer paper has a basis weight of 1–20 $g/m^2$.

98. A multi-layer paper as claimed in claim 13, wherein at least one of said tissue sheet peeled from said multi-layer paper has a basis weight of 1–20 g/m².

99. A multi-layer paper as claimed in claim 14, wherein at least one of said tissue sheet peeled from said multi-layer paper has a basis weight of 1–20 g/m².

100. A multi-layer paper as claimed in claim 15, wherein at least one of said tissue sheet peeled from said multi-layer paper has a basis weight of 1–20 g/m².

101. A multi-layer paper as claimed in claim 16, wherein at least one of said tissue sheet peeled from said multi-layer paper has a basis weight of 1–20 g/m².

102. A multi-layer paper as claimed in claim 3, wherein the tissue sheet peeled from said multi-layer paper and made of the synthetic fibers has a density of not greater than 0.35 g/cm³.

103. A multi-layer paper as claimed in claim 4, wherein the tissue sheet peeled from said multi-layer paper and made of the synthetic fibers has a density of not greater than 0.35 g/cm³.

104. A multi-layer paper as claimed in claim 5, wherein the tissue sheet peeled from said multi-layer paper and made of the synthetic fibers has a density of not greater than 0.35 g/cm³.

105. A multi-layer paper as claimed in claim 6, wherein the tissue sheet peeled from said multi-layer paper and made of the synthetic fibers has a density of not greater than 0.35 g/cm³.

106. A multi-layer paper as claimed in claim 7, wherein the tissue sheet peeled from said multi-layer paper and made of the synthetic fibers has a density of not greater than 0.35 g/cm³.

107. A multi-layer paper as claimed in claim 8, wherein the tissue sheet peeled from said multi-layer paper and made of the synthetic fibers has a density of not greater than 0.35 g/cm³.

108. A multi-layer paper as claimed in 21, wherein said paper layer which can cause intralayer delamination is mainly made of polyester fibers.

109. A multi-layer paper as claimed in claim 22, wherein said paper layer which can cause intralayer delamination is mainly made of polyester fibers.

110. A multi-layer paper as claimed in claim 23, wherein said paper layer which can cause intralayer delamination is mainly made of polyester fibers.

111. A multi-layer paper as claimed in claim 24, wherein said paper layer which can cause intralayer delamination is mainly made of polyester fibers.

112. A multi-layer paper as claimed in claim 21, wherein said paper layer which can cause intralayer delamination is mainly made of cellulose fibers.

113. A multi-layer paper as claimed in claim 22, wherein said paper layer which can cause intralayer delamination is mainly made of cellulose fibers.

114. A multi-layer paper as claimed in claim 23, wherein said paper layer which can cause intralayer delamination is mainly made of cellulose fibers.

115. A multi-layer paper as claimed in claim 24, wherein said paper layer which can cause intralayer delamination is mainly made of cellulose fibers.

116. A method of forming tissue sheets, comprising providing a multi-layer paper according to claim 2, and delaminating said multi-layer paper at said peelable paper layer interface to obtain at least two tissue sheets.

117. A method of forming tissue sheets, comprising providing a multi-layer paper according to claim 3, and delaminating said multi-layer paper at said peelable paper layer interface to obtain at least two tissue sheets.

118. A method of forming tissue sheets, comprising providing a multi-layer paper according to claim 4, and delaminating said multi-layer paper at said peelable paper layer interface to obtain at least two tissue sheets.

119. A method of forming tissue sheets, comprising providing a multi-layer paper according to claim 5, and delaminating said multi-layer paper at said peelable paper layer interface to obtain at least two tissue sheets.

120. A method of forming tissue sheets, comprising providing a multi-layer paper according to claim 6, and delaminating said multi-layer paper at said peelable paper layer interface to obtain at least two tissue sheets.

121. A method of forming tissue sheets, comprising providing a multi-layer paper according to claim 7, and delaminating said multi-layer paper at said peelable paper layer interface to obtain at least two tissue sheets.

122. A method of forming tissue sheets, comprising providing a multi-layer paper according to claim 8, and delaminating said multi-layer paper at said peelable paper layer interface to obtain at least two tissue sheets.

123. A method of forming tissue sheets, comprising providing a multi-layer paper according to claim 9, and delaminating said multi-layer paper at said peelable paper layer interface to obtain at least two tissue sheets.

124. A method of forming tissue sheets, comprising providing a multi-layer paper according to claim 10, and delaminating said multi-layer paper at said peelable paper layer interface to obtain at least two tissue sheets.

125. A method of forming tissue sheets, comprising providing a multi-layer paper according to claim 11, and delaminating said multi-layer paper at said peelable paper layer interface to obtain at least two tissue sheets.

126. A method of forming tissue sheets, comprising providing a multi-layer paper according to claim 12, and delaminating said multi-layer paper at said peelable paper layer interface to obtain at least two tissue sheets.

127. A method of forming tissue sheets, comprising providing a multi-layer paper according to claim 13, and delaminating said multi-layer paper at said peelable paper layer interface to obtain at least two tissue sheets.

128. A method of forming tissue sheets, comprising providing a multi-layer paper according to claim 14, and delaminating said multi-layer paper at said peelable paper layer interface to obtain at least two tissue sheets.

129. A method of forming tissue sheets, comprising providing a multi-layer paper according to claim 15, and delaminating said multi-layer paper at said peelable paper layer interface to obtain at least two tissue sheets.

130. A method of forming tissue sheets, comprising providing a multi-layer paper according to claim 16, and delaminating said multi-layer paper at said peelable paper layer interface to obtain at least two tissue sheets.

131. A method of forming tissue sheets, comprising providing a multi-layer paper according to claim 17, and delaminating said multi-layer paper at said peelable paper layer interface to obtain at least two tissue sheets.

132. A method of forming tissue sheets, comprising providing a multi-layer paper according to claim 18, and delaminating said multi-layer paper at said peelable paper layer interface to obtain at least two tissue sheets.

133. A method of forming tissue sheets, comprising providing a multi-layer paper according to claim 19, and delaminating said multi-layer paper at said peelable paper layer interface to obtain at least two tissue sheets.

134. A method of forming tissue sheets, comprising providing a multi-layer paper according to claim 21, and delaminating said multi-layer paper at said paper layer which can cause intralayer delamination to obtain at least two tissue sheets.

135. A method of forming tissue sheets, comprising providing a multi-layer paper according to claim 22, and delaminating said multi-layer paper at said paper layer which can cause intralayer delamination to obtain at least two tissue sheets.

136. A method of forming tissue sheets, comprising providing a multi-layer paper according to claim 23, and delaminating said multi-layer paper at said paper layer which can cause intralayer delamination to obtain at least two tissue sheets.

137. A method of forming tissue sheets, comprising providing a multi-layer paper according to claim 24, and delaminating said multi-layer paper at said paper layer which can cause intralayer delamination to obtain at least two tissue sheets.

138. A method of forming tissue sheets, comprising providing a multi-layer paper according to claim 25, and delaminating said multi-layer paper at said paper layer which can cause intralayer delamination to obtain at least two tissue sheets.

139. A method of forming tissue sheets, comprising providing a multi-layer paper according to claim 26, and delaminating said multi-layer paper at said paper layer which can cause intralayer delamination to obtain at least two tissue sheets.

140. A method of forming tissue sheets, comprising providing a multi-layer paper according to claim 27, and delaminating said multi-layer paper at said paper layer which can cause intralayer delamination to obtain at least two tissue sheets.

141. A method of forming tissue sheets, comprising providing a multi-layer paper according to claim 28, and delaminating said multi-layer paper at said paper layer which can cause intralayer delamination to obtain at least two tissue sheets.

142. A tissue sheet obtained by a method according to claim 30 and having a basis weight of 2–20 g/m$^2$.

143. A tissue sheet obtained by a method according to claim 31 and having a basis weight of 2–20 g/m$^2$.

144. A tissue sheet obtained by a method according to claim 32 and having a basis weight of 2–20 g/m$^2$.

145. A reinforced multi-layer paper material, comprising a multi-layer paper according to claim 2 and a reinforcing member bonded to at least one of the both sides of said multi-layer paper.

146. A reinforced multi-layer paper material, comprising a multi-layer paper according to claim 3 and a reinforcing member bonded to at least one of the both sides of said multi-layer paper.

147. A reinforced multi-layer paper material, comprising a multi-layer paper according to claim 4 and a reinforcing member bonded to at least one of the both sides of said multi-layer paper.

148. A reinforced multi-layer paper material, comprising a multi-layer paper according to claim 5 and a reinforcing member bonded to at least one of the both sides of said multi-layer paper.

149. A reinforced multi-layer paper material, comprising a multi-layer paper according to claim 6 and a reinforcing member bonded to at least one of the both sides of said multi-layer paper.

150. A reinforced multi-layer paper material, comprising a multi-layer paper according to claim 7 and a reinforcing member bonded to at least one of the both sides of said multi-layer paper.

151. A reinforced multi-layer paper material, comprising a multi-layer paper according to claim 8 and a reinforcing member bonded to at least one of the both sides of said multi-layer paper.

152. A reinforced multi-layer paper material, comprising a multi-layer paper according to claim 9 and a reinforcing member bonded to at least one of the both sides of said multi-layer paper.

153. A reinforced multi-layer paper material, comprising a multi-layer paper according to claim 10 and a reinforcing member bonded to at least one of the both sides of said multi-layer paper.

154. A reinforced multi-layer paper material, comprising a multi-layer paper according to claim 11 and a reinforcing member bonded to at least one of the both sides of said multi-layer paper.

155. A reinforced multi-layer paper material, comprising a multi-layer paper according to claim 12 and a reinforcing member bonded to at least one of the both sides of said multi-layer paper.

156. A reinforced multi-layer paper material, comprising a multi-layer paper according to claim 13 and a reinforcing member bonded to at least one of the both sides of said multi-layer paper.

157. A reinforced multi-layer paper material, comprising a multi-layer paper according to claim 14 and a reinforcing member bonded to at least one of the both sides of said multi-layer paper.

158. A reinforced multi-layer paper material, comprising a multi-layer paper according to claim 15 and a reinforcing member bonded to at least one of the both sides of said multi-layer paper.

159. A reinforced multi-layer paper material, comprising a multi-layer paper according to claim 16 and a reinforcing member bonded to at least one of the both sides of said multi-layer paper.

160. A reinforced multi-layer paper material, comprising a multi-layer paper according to claim 17 and a reinforcing member bonded to at least one of the both sides of said multi-layer paper.

161. A reinforced multi-layer paper material, comprising a multi-layer paper according to claim 18 and a reinforcing member bonded to at least one of the both sides of said multi-layer paper.

162. A reinforced multi-layer paper material, comprising a multi-layer paper according to claim 19 and a reinforcing member bonded to at least one of the both sides of said multi-layer paper.

163. A reinforced multi-layer paper material, comprising a multi-layer paper according to claim 20 and a reinforcing member bonded to at least one of the both sides of said multi-layer paper.

164. A reinforced multi-layer paper material, comprising a multi-layer paper according to claim 21 and a reinforcing member bonded to at least one of the both sides of said multi-layer paper.

165. A reinforced multi-layer paper material, comprising a multi-layer paper according to claim 22 and a reinforcing member bonded to at least one of the both sides of said multi-layer paper.

166. A reinforced multi-layer paper material, comprising a multi-layer paper according to claim 23 and a reinforcing member bonded to at least one of the both sides of said multi-layer paper.

167. A reinforced multi-layer paper material, comprising a multi-layer paper according to claim 24 and a reinforcing member bonded to at least one of the both sides of said multi-layer paper.

168. A reinforced multi-layer paper material, comprising a multi-layer paper according to claim 25 and a reinforcing member bonded to at least one of the both sides of said multi-layer paper.

169. A reinforced multi-layer paper material, comprising a multi-layer paper according to claim 26 and a reinforcing member bonded to at least one of the both sides of said multi-layer paper.

170. A reinforced multi-layer paper material, comprising a multi-layer paper according to claim 27 and a reinforcing member bonded to at least one of the both sides of said multi-layer paper.

171. A reinforced multi-layer paper material, comprising a multi-layer paper according to claim 28 and a reinforcing member bonded to at least one of the both sides of said multi-layer paper.

172. A method of preparing a reinforced tissue sheet material, comprising providing a reinforced multi-layer paper material according to claim 37, and delaminating said multi-layer paper to obtain a reinforced tissue sheet material having said reinforcing member bonded thereto.

173. A porous support material for producing a heat-sensitive stencil printing master, comprising a multi-layer paper according to claim 2.

174. A porous support material for producing a heat-sensitive stencil printing master, comprising a multi-layer paper according to claim 3.

175. A porous support material for producing a heat-sensitive stencil printing master, comprising a multi-layer paper according to claim 4.

176. A porous support material for producing a heat-sensitive stencil printing master, comprising a multi-layer paper according to claim 5.

177. A porous support material for producing a heat-sensitive stencil printing master, comprising a multi-layer paper according to claim 6.

178. A porous support material for producing a heat-sensitive stencil printing master, comprising a multi-layer paper according to claim 7.

179. A porous support material for producing a heat-sensitive stencil printing master, comprising a multi-layer paper according to claim 8.

180. A porous support material for producing a heat-sensitive stencil printing master, comprising a multi-layer paper according to claim 9.

181. A porous support material for producing a heat-sensitive stencil printing master, comprising a multi-layer paper according to claim 10.

182. A porous support material for producing a heat-sensitive stencil printing master, comprising a multi-layer paper according to claim 11.

183. A porous support material for producing a heat-sensitive stencil printing master, comprising a multi-layer paper according to claim 12.

184. A porous support material for producing a heat-sensitive stencil printing master, comprising a multi-layer paper according to claim 13.

185. A porous support material for producing a heat-sensitive stencil printing master, comprising a multi-layer paper according to claim 14.

186. A porous support material for producing a heat-sensitive stencil printing master, comprising a multi-layer paper according to claim 15.

187. A porous support material for producing a heat-sensitive stencil printing master, comprising a multi-layer paper according to claim 16.

188. A porous support material for producing a heat-sensitive stencil printing master, comprising a multi-layer paper according to claim 17.

189. A porous support material for producing a heat-sensitive stencil printing master, comprising a multi-layer paper according to claim 18.

190. A porous support material for producing a heat-sensitive stencil printing master, comprising a multi-layer paper according to claim 19.

191. A porous support material for producing a heat-sensitive stencil printing master, comprising a multi-layer paper according to claim 20.

192. A porous support material for producing a heat-sensitive stencil printing master, comprising a multi-layer paper according to claim 21.

193. A porous support material for producing a heat-sensitive stencil printing master, comprising a multi-layer paper according to claim 22.

194. A porous support material for producing a heat-sensitive stencil printing master, comprising a multi-layer paper according to claim 23.

195. A porous support material for producing a heat-sensitive stencil printing master, comprising a multi-layer paper according to claim 24.

196. A porous support material for producing a heat-sensitive stencil printing master, comprising a multi-layer paper according to claim 25.

197. A porous support material for producing a heat-sensitive stencil printing master, comprising a multi-layer paper according to claim 26.

198. A porous support material for producing a heat-sensitive stencil printing master, comprising a multi-layer paper according to claim 27.

199. A porous support material for producing a heat-sensitive stencil printing master, comprising a multi-layer paper according to claim 28.

200. A material for producing a heat-sensitive stencil printing master, comprising a laminate obtained by bonding a thermoplastic polymer film to at least one side of a multi-layer paper according to claim 2.

201. A material for producing a heat-sensitive stencil printing master, comprising a laminate obtained by bonding a thermoplastic polymer film to at least one side of a multi-layer paper according to claim 3.

202. A material for producing a heat-sensitive stencil printing master, comprising a laminate obtained by bonding a thermoplastic polymer film to at least one side of a multi-layer paper according to claim 4.

203. A material for producing a heat-sensitive stencil printing master, comprising a laminate obtained by bonding a thermoplastic polymer film to at least one side of a multi-layer paper according to claim 5.

204. A material for producing a heat-sensitive stencil printing master, comprising a laminate obtained by bonding a thermoplastic polymer film to at least one side of a multi-layer paper according to claim 6.

205. A material for producing a heat-sensitive stencil printing master, comprising a laminate obtained by bonding a thermoplastic polymer film to at least one side of a multi-layer paper according to claim 7.

206. A material for producing a heat-sensitive stencil printing master, comprising a laminate obtained by bonding a thermoplastic polymer film to at least one side of a multi-layer paper according to claim 8.

207. A material for producing a heat-sensitive stencil printing master, comprising a laminate obtained by bonding a thermoplastic polymer film to at least one side of a multi-layer paper according to claim 9.

208. A material for producing a heat-sensitive stencil printing master, comprising a laminate obtained by bonding a thermoplastic polymer film to at least one side of a multi-layer paper according to claim 10.

209. A material for producing a heat-sensitive stencil printing master, comprising a laminate obtained by bonding a thermoplastic polymer film to at least one side of a multi-layer paper according to claim 11.

210. A material for producing a heat-sensitive stencil printing master, comprising a laminate obtained by bonding a thermoplastic polymer film to at least one side of a multi-layer paper according to claim 12.

211. A material for producing a heat-sensitive stencil printing master, comprising a laminate obtained by bonding a thermoplastic polymer film to at least one side of a multi-layer paper according to claim 13.

212. A material for producing a heat-sensitive stencil printing master, comprising a laminate obtained by bonding a thermoplastic polymer film to at least one side of a multi-layer paper according to claim 14.

213. A material for producing a heat-sensitive stencil printing master, comprising a laminate obtained by bonding a thermoplastic polymer film to at least one side of a multi-layer paper according to claim 15.

214. A material for producing a heat-sensitive stencil printing master, comprising a laminate obtained by bonding a thermoplastic polymer film to at least one side of a multi-layer paper according to claim 16.

215. A material for producing a heat-sensitive stencil printing master, comprising a laminate obtained by bonding a thermoplastic polymer film to at least one side of a multi-layer paper according to claim 17.

216. A material for producing a heat-sensitive stencil printing master, comprising a laminate obtained by bonding a thermoplastic polymer film to at least one side of a multi-layer paper according to claim 18.

217. A material for producing a heat-sensitive stencil printing master, comprising a laminate obtained by bonding a thermoplastic polymer film to at least one side of a multi-layer paper according to claim 19.

218. A material for producing a heat-sensitive stencil printing master, comprising a laminate obtained by bonding a thermoplastic polymer film to at least one side of a multi-layer paper according to claim 20.

219. A material for producing a heat-sensitive stencil printing master, comprising a laminate obtained by bonding a thermoplastic polymer film to at least one side of a multi-layer paper according to claim 21.

220. A material for producing a heat-sensitive stencil printing master, comprising a laminate obtained by bonding a thermoplastic polymer film to at least one side of a multi-layer paper according to claim 22.

221. A material for producing a heat-sensitive stencil printing master, comprising a laminate obtained by bonding a thermoplastic polymer film to at least one side of a multi-layer paper according to claim 23.

222. A material for producing a heat-sensitive stencil printing master, comprising a laminate obtained by bonding a thermoplastic polymer film to at least one side of a multi-layer paper according to claim 24.

223. A material for producing a heat-sensitive stencil printing master, comprising a laminate obtained by bonding a thermoplastic polymer film to at least one side of a multi-layer paper according to claim 25.

224. A material for producing a heat-sensitive stencil printing master, comprising a laminate obtained by bonding a thermoplastic polymer film to at least one side of a multi-layer paper according to claim 26.

225. A material for producing a heat-sensitive stencil printing master, comprising a laminate obtained by bonding a thermoplastic polymer film to at least one side of a multi-layer paper according to claim 27.

226. A material for producing a heat-sensitive stencil printing master, comprising a laminate obtained by bonding a thermoplastic polymer film to at least one side of a multi-layer paper according to claim 28.

* * * * *